United States Patent [19]
Keller et al.

[11] Patent Number: 5,718,050
[45] Date of Patent: Feb. 17, 1998

[54] PRUNING CUTTER

[75] Inventors: Harold A. Keller, Clarkston, Wash.;
Patrick J. Young; Dale R. Alldredge,
both of Lewiston, Id.

[73] Assignee: Technic Tool Corporation, Lewiston, Id.

[21] Appl. No.: 612,666

[22] Filed: Mar. 8, 1996

[51] Int. Cl.$^6$ ........................................ B27B 17/02
[52] U.S. Cl. ................... 30/123.4; 30/383; 30/296.1; 30/276
[58] Field of Search ................... 30/123.3, 383, 30/296.1, 123.4, 276

[56] References Cited

U.S. PATENT DOCUMENTS

| | | | |
|---|---|---|---|
| 2,703,928 | 3/1955 | Southwick | 30/386 |
| 2,751,940 | 6/1956 | Miller | 30/166.3 |
| 2,777,483 | 1/1957 | Cherem | 30/382 |
| 2,815,048 | 12/1957 | Davis | 30/383 |
| 3,266,534 | 8/1966 | Carnesecca, Jr. et al. | 30/383 |
| 3,291,167 | 12/1966 | Varden | 30/122 |
| 3,340,612 | 9/1967 | Knight | 30/394 |
| 3,343,613 | 9/1967 | Carnesecca, Jr. et al. | 173/169 |
| 3,618,340 | 11/1971 | Geisthoff et al. | 464/162 |
| 3,657,813 | 4/1972 | Knight | 30/373 |
| 3,715,805 | 2/1973 | Fraser | 30/166.3 |
| 3,731,380 | 5/1973 | Mathiesen | 30/381 |
| 3,731,382 | 5/1973 | Wroe | 30/381 |
| 4,048,722 | 9/1977 | Howard | 30/386 |
| 4,122,601 | 10/1978 | Katsuya | 30/298.4 |
| 4,207,675 | 6/1980 | Causey et al. | 30/296.1 |
| 4,341,017 | 7/1982 | Janczak | 30/381 |
| 4,505,040 | 3/1985 | Everts | 30/296.1 |
| 4,654,971 | 4/1987 | Fettes et al. | 30/383 |
| 4,714,447 | 12/1987 | Hironaka | 464/52 |
| 4,807,361 | 2/1989 | Raczkowski | 30/123.3 |
| 4,924,573 | 5/1990 | Huddleston et al | 30/276 |
| 4,953,294 | 9/1990 | Dohse | 30/276 |
| 4,976,031 | 12/1990 | Miller | 30/296.1 |
| 4,998,401 | 3/1991 | Terai et al. | 30/276 |
| 5,013,282 | 5/1991 | Keller | 464/52 |
| 5,175,932 | 1/1993 | Lange et al. | 30/276 |
| 5,364,307 | 11/1994 | Shaulis | 30/276 |

FOREIGN PATENT DOCUMENTS

| | | | |
|---|---|---|---|
| 40257 | 2/1932 | France | 30/123.4 |
| 756690 | 9/1933 | France | 30/123.3 |

*Primary Examiner*—Hwei-Siu Payer
*Attorney, Agent, or Firm*—Wood, Phillips, Van Santen, Clark & Mortimer

[57] ABSTRACT

A powered pruning saw is disclosed in which a drive motor is connected to an elongated drive shaft rotatably held within an shaft or pole. A gear head is mounted at the other end of the pole to the remote end of the drive shaft. The gear head includes a gear housing formed of two housing halves, with a pinion rotatably mounted by a pinion bearing within the gear housing for coaxial rotation with the drive shaft. The pinion shaft mounts the pinion at one end and a drive shaft receiver at a remaining end for releasably receiving an end of the drive shaft. A cutter arbor shaft is also rotatably mounted in the gear head, and mounts a gear in meshing engagement with the pinion. A cutter arbor shaft bearing mounts the cutter arbor shaft and gear for rotation about a cutter arbor shaft axis that is angularly offset from the drive shaft axis. A cutter is releasably attached to the cutter arbor shaft. The gear housing halves are joined along a plane normal to the cutter arbor shaft axis and include journal boxes formed therein for receiving and clamping the pinion bearing. Clamp members join and fasten the housing halves together with clamping forces substantially parallel to the arbor shaft axis. Also disclosed are apparatus for installing sleeves over selected lengths of the shaft or pole by selectively expanding the sleeves and providing low friction surfaces over which the sleeves may be slid. Also disclosed is an apparatus for dispensing a measured quantity of fluid lubricant to the cutter by tipping the saw.

20 Claims, 28 Drawing Sheets

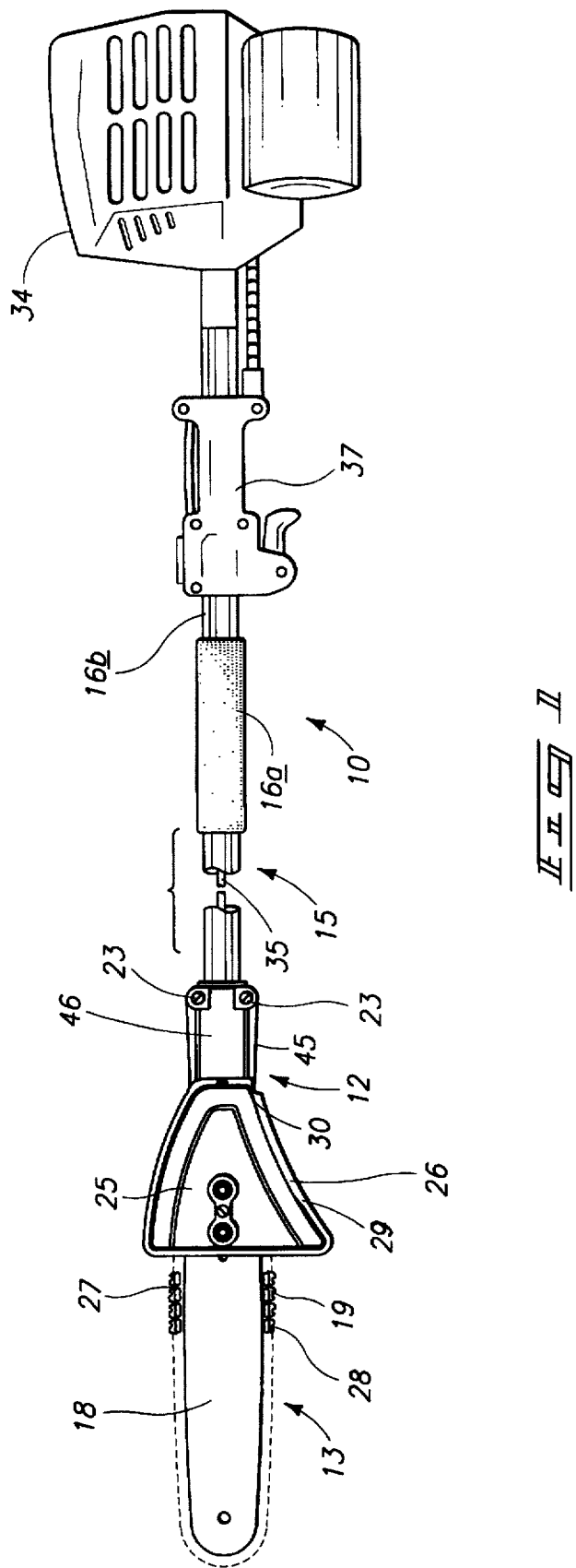

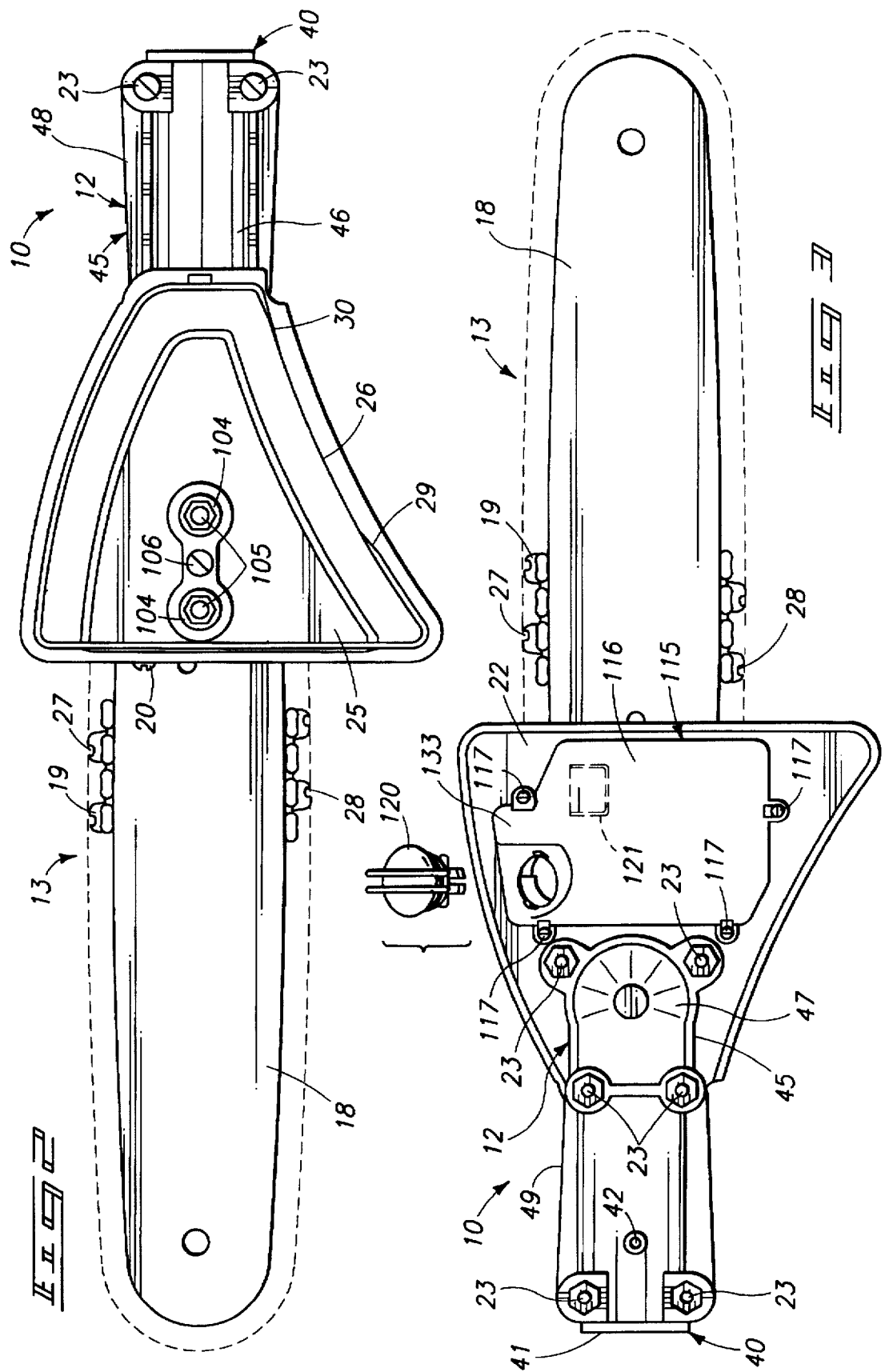

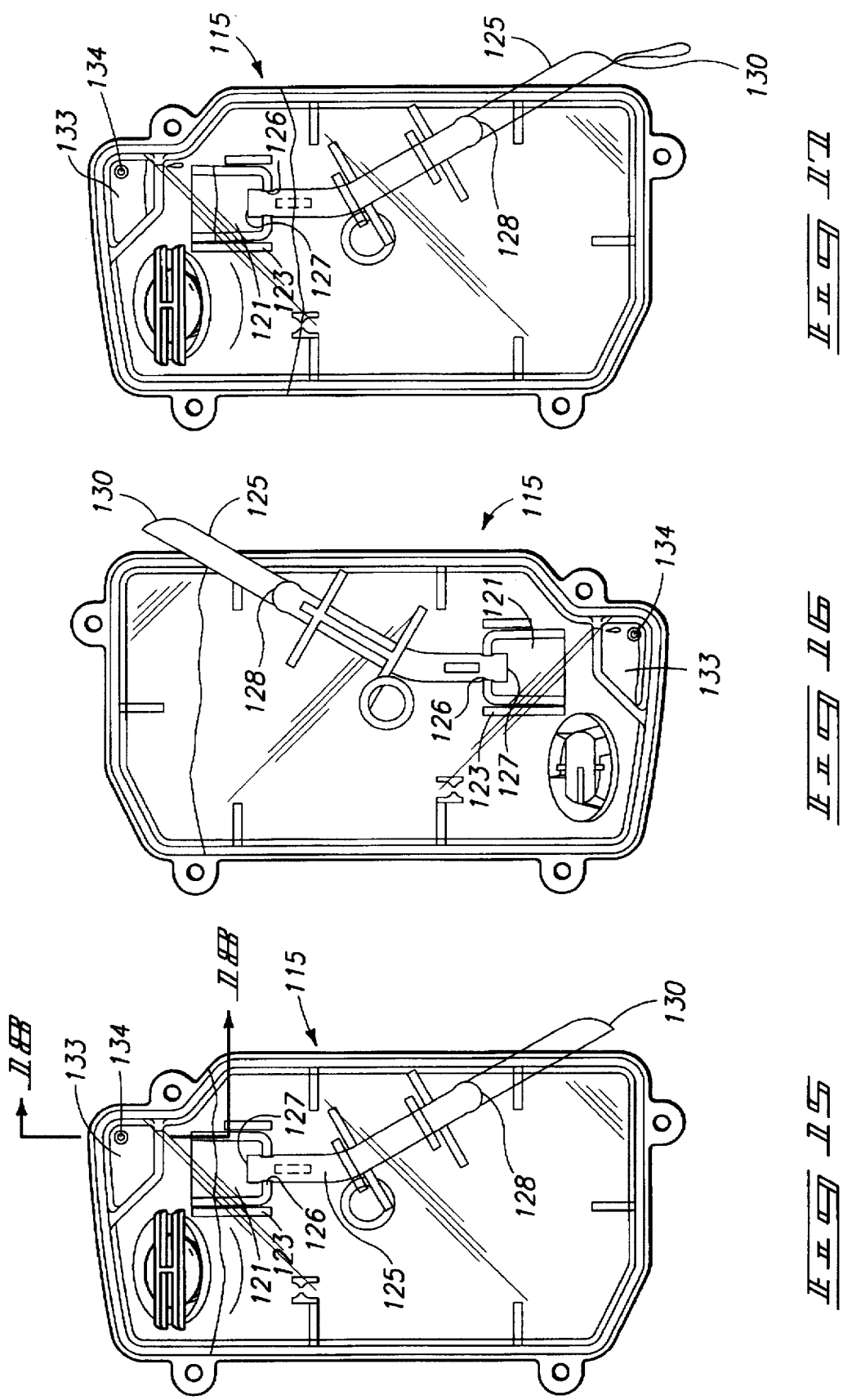

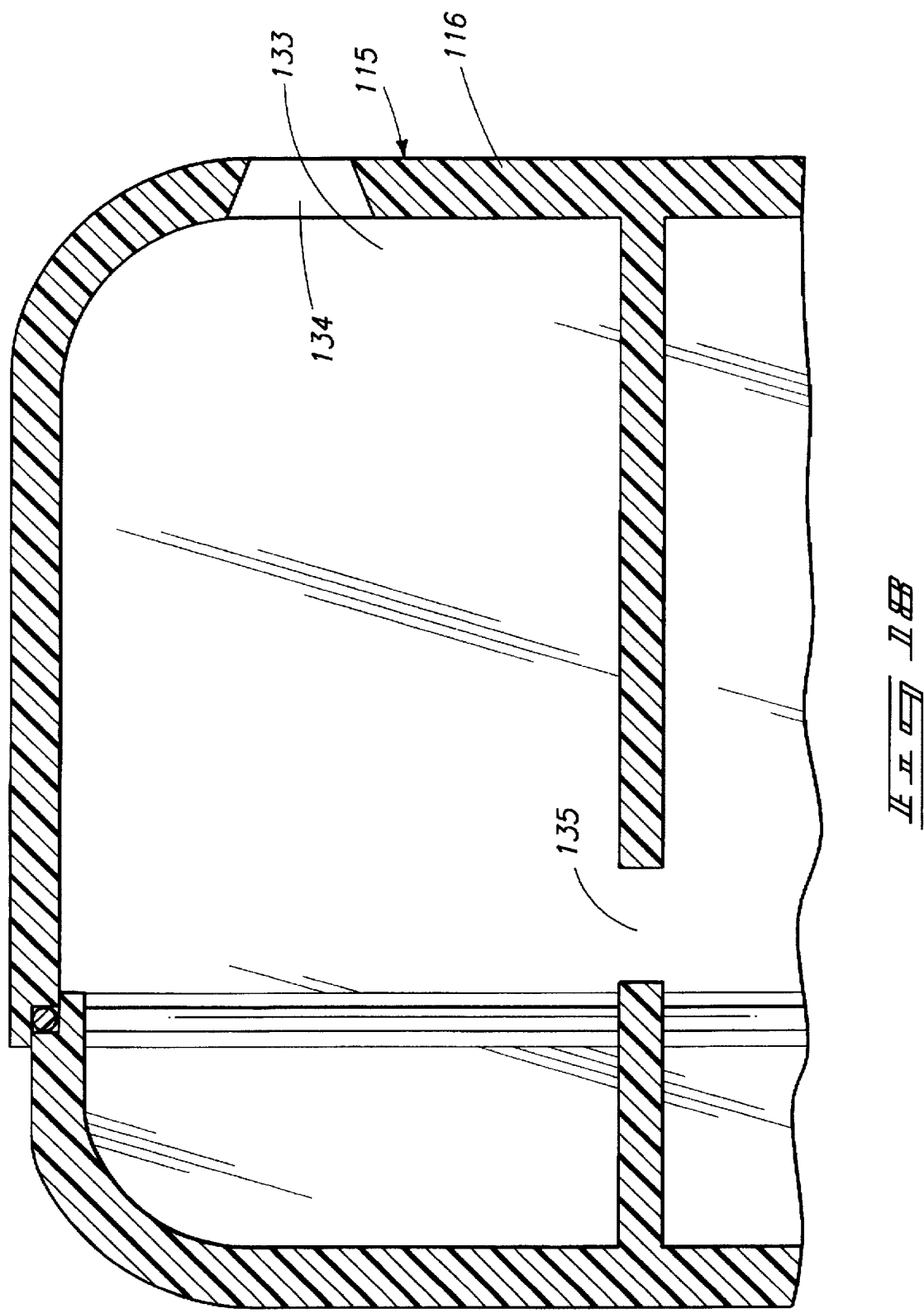

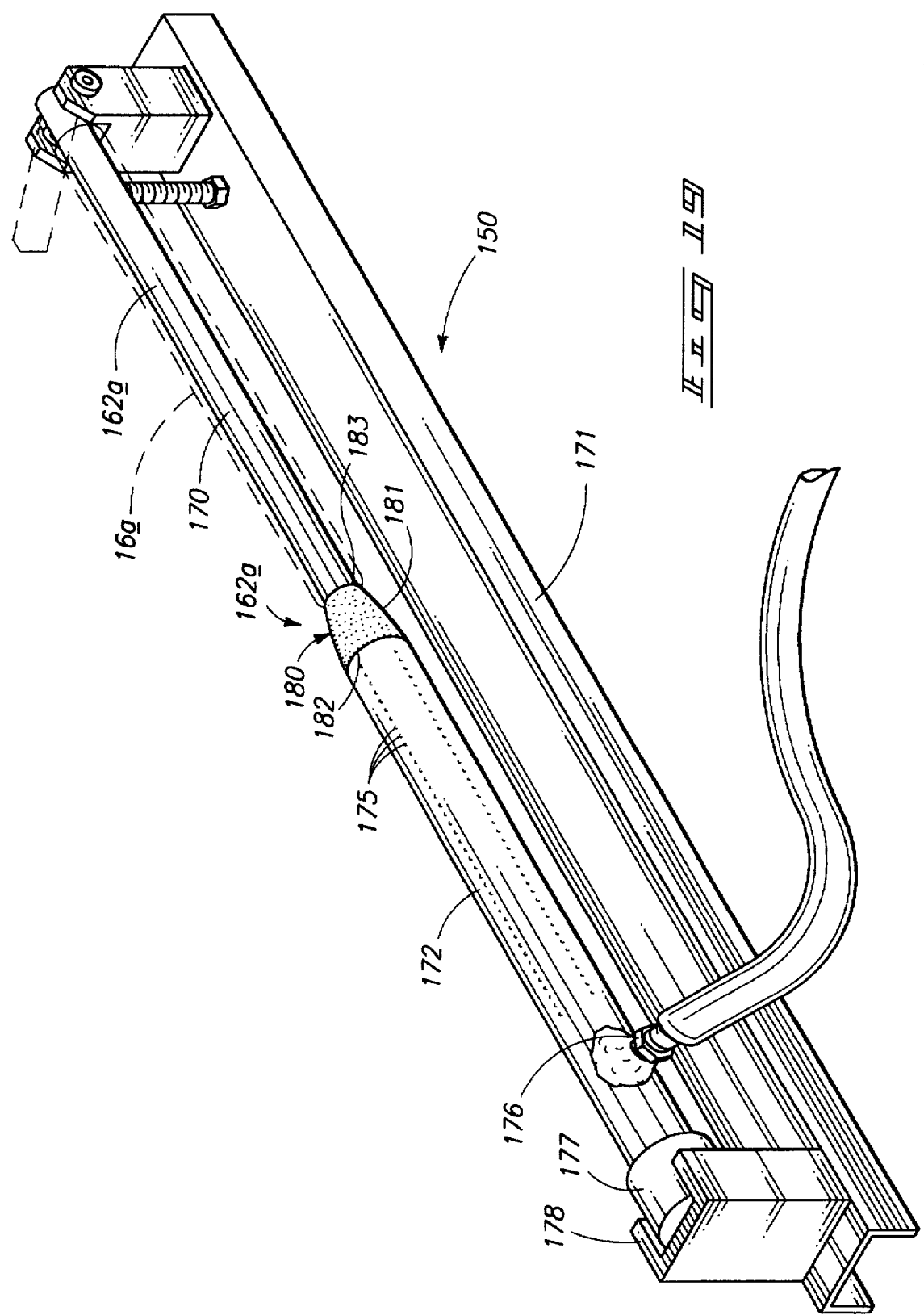

PRUNING CUTTER

TECHNICAL FIELD

The present invention relates to portable powered cutters for pruning trees and the like, and to equipment for aiding construction of such cutters, and for installation of elastomeric sleeves over elongated poles for such powered cutters.

BACKGROUND OF THE INVENTION

Tree pruning is a tiresome and often dangerous task. In the past, pruning has been accomplished using an ordinary pruning saw from an elevated support. To eliminate some of the inherent danger in tree climbing, extended pruners have been developed.

The first extended pruners, some of which are still in use and on the market place, involve a combination of a pruning saw or clipper and a long pole. The saw or clipper is attached at the end of the pole, allowing the worker to stand on the ground surface U.S. Pat. No. 4,654,971, licensed to the present assignee discloses an advanced pole type pruner with an engine at one end of an elongated pole operating a cutting head at an opposite pole end. Many of such pruners have been in use and function well.

Another simple form of a portable, extended pole powered pruning cutter involves use of an electric motor at the cutter end of an elongated shaft, driving a small chain saw cutter. An electric circuit is required for connection of the electric cord to a power source.

Another form of powered pruning cutter includes an engine at one end of a pole, with a central driving shaft and connecting the engine to a reciprocating saw blade.

Another form includes an engine attached to a short pole, with a fixture that permits one of several tools, including a pruning saw to be attached. The tools are available with several fixed shaft lengths.

An extendable pole pruning cutter has also been developed that operates with a hydraulic fluid pumped by a hydraulic pump worn on the back of the operator. The hydraulic hose is threaded through the pole. Extra hose length must be pulled into the pole when it is extended. A hydraulic motor is attached to the hose to operate a chain saw at the remote end of the device.

Another compressed fluid pruning saw is driven by fluid pressure pumped through external hoses that connect directly to the saw head. The saw head mounts a circular type saw. The driving fluid is supplied through a fluid pressure system mounted to a "man lift" so the cutter is dependent upon power from the associated lift.

U.S. Pat. No. 5,013,282, issued to the present assignee, discloses an improvement in the field of portable pruning cutters. The patented saw includes a chain saw type cutter head at one end of an elongated extensible shaft. The cutter chain is driven through a gear head at the shaft end. While this unit operates well, improvements are still desirous in construction of the cutter, in order to minimize manufacturing expense, and to maximize its useful life.

BRIEF DESCRIPTION OF THE DRAWINGS

Preferred embodiments of the invention are described below with reference to the following accompanying drawings.

FIG. 1 is a fragmented side elevation view of the complete pruning saw of a preferred form;

FIG. 2 is a side elevation view of the cutter head of a first preferred form, with the cutter chain shown partially by dashed lines;

FIG. 3 is an opposite side view of the cutter head showing an oil reservoir and a closure cap removed therefrom;

FIG. 15 is a detail view of a preferred oil reservoir for the cutter head with oil therein;

FIG. 16 is a view similar to FIG. 15 only showing tipping of the reservoir to fill a metering cup within the reservoir;

FIG. 17 is a view similar to FIG. 15 only showing gravitational flow of oil from the metering cup;

FIG. 18 is an enlarged sectional view taken substantially along line 18—18 in FIG. 15;

FIG. 19 is a perspective view of a sleeve expansion apparatus of a first preferred form;

FIG. 31 is a sectional view taken substantially along line 31—31 in

FIG. 30;

FIG. 34 is a view similar to FIG. 33 only showing the elastomeric sleeve being installed over the pole by operation of the linkage and a collar part of the cuff.

DETAILED DESCRIPTION OF THE PREFERRED EMBODIMENTS

Figure 4:
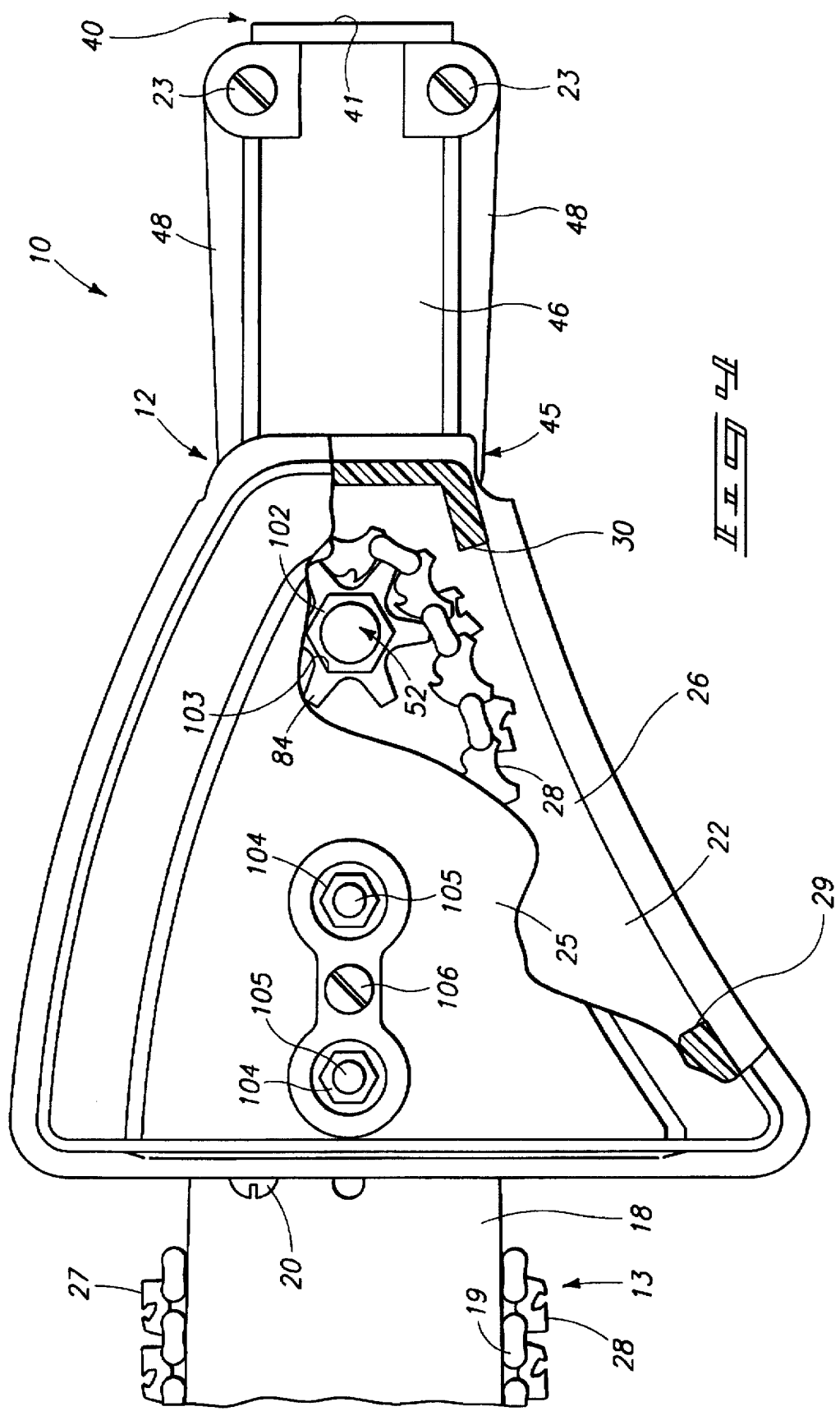
FIG. 4 is an enlarged partially fragmented detail view of a sprocket cover on the cutter head, showing details of a chip discharge opening thereon.

This disclosure of the invention is submitted in furtherance of the constitutional purposes of the U.S. Patent Laws "to promote the progress of science and useful arts" (Article 1, Section 8).

A powered pruning cutter incorporating improvements of the present invention is generally identified in FIG. 1 of the drawings by the reference numeral 10. A novel cutter mounting gear head 12 is disclosed for the powered pruning cutter 10, mounting a cutter 13 for operation at a remote end of an elongated drive shaft housing or pole 15.

Apparatus 10 is also disclosed herein for use in expanding elastomeric sleeves 16a, 16b, to enable placement of the sleeves 16a, 16b, over the pole 15. Preferred forms of such apparatus are shown in FIGS. 19-34.

Figure 5:
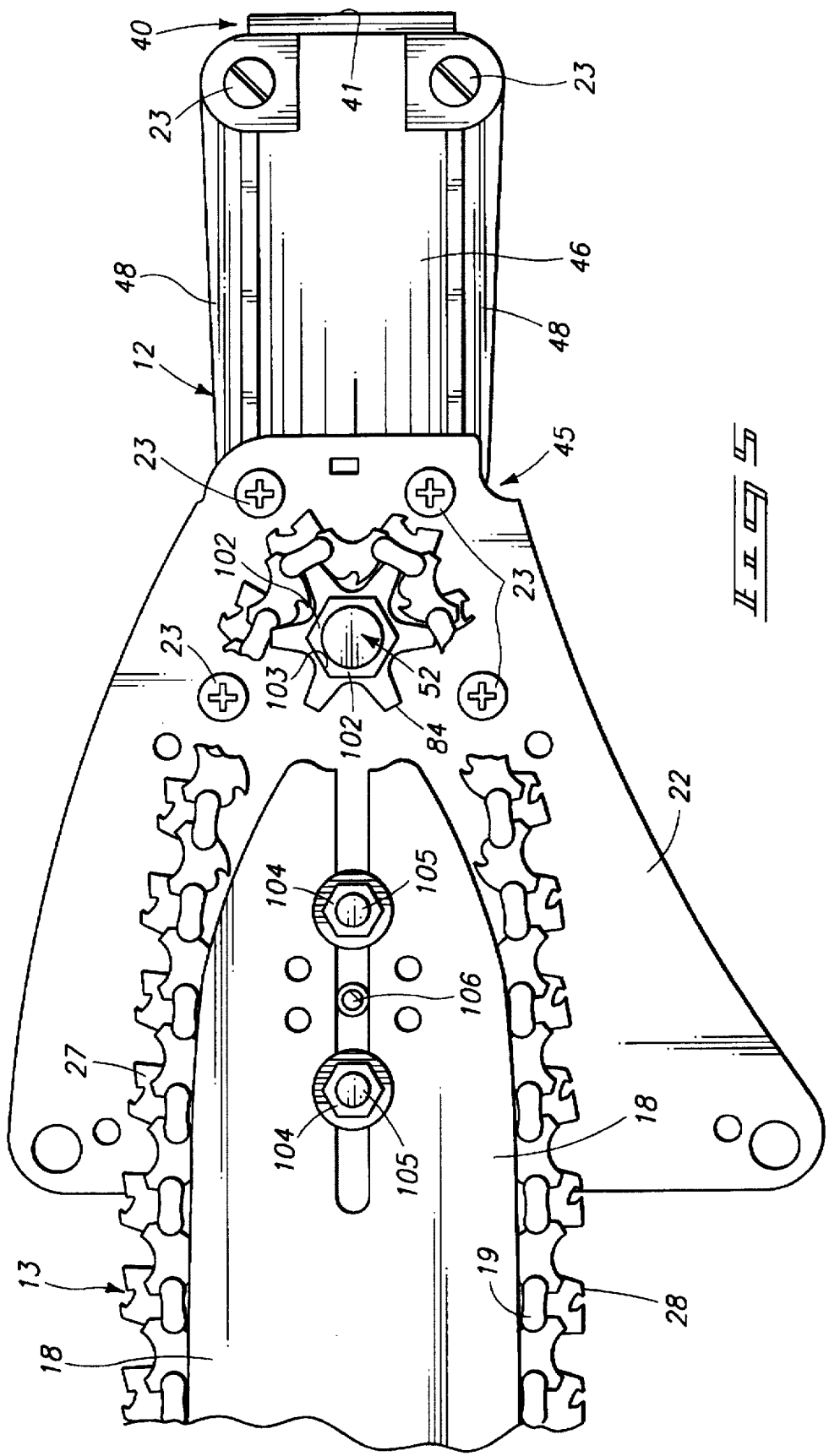
FIG. 5 is an enlarged partially fragmented detail view similar to FIG. 4 only showing the sprocket cover removed.
Figure 6:
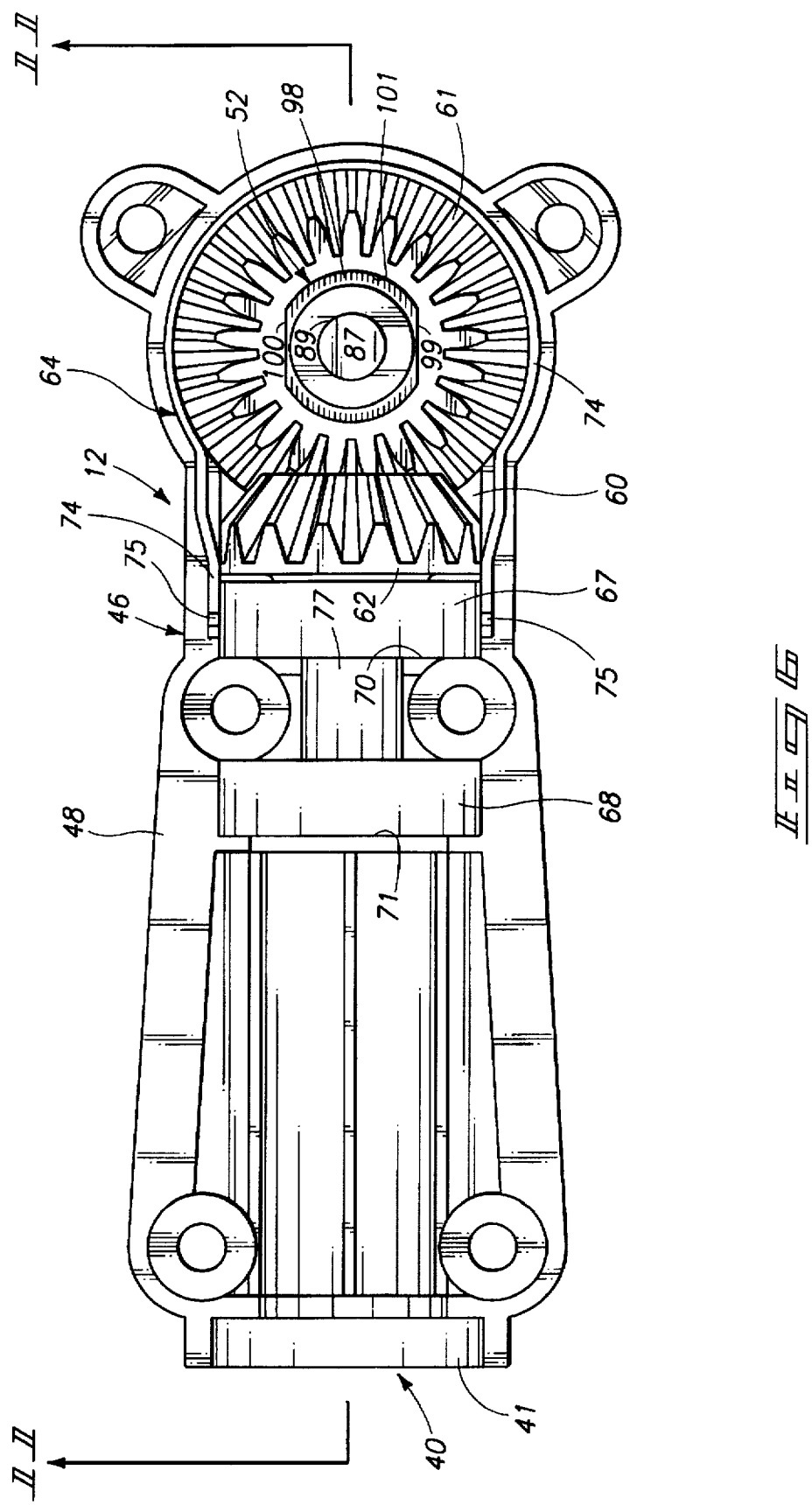
FIG. 6 is an enlarged detail view of a cutter mounting half of the gear head with gears and bearings installed.

The cutter 13 exemplified in the drawings is a standard form of chain saw, including a cutter bar 18 and a cutter chain 19 trained over the bar 18 in a conventional manner. The bar 18 is mounted to the gear head 12 using known bar and chain mounts 20 (FIG. 20) on a cutter carrier plate 22 (FIG. 5) that in turn is secured to the gear head 12.

It is pointed out that the cutter 13 is exemplified in a preferred form as a chain saw. Other forms of cutters may be used with the present invention, including but not limited to circular saws, flails, reciprocating saws, (not shown) or equivalent cutters that may be made to operate from a rotatable arbor.

The cutter bar carrier plate 22 is mounted to the gear head 12 and mounts the cutter bar 18 to extend axially therefrom with respect to the drive shaft axis. The carrier plate 22 is preferably formed of rigid material such as steel, and is secured by clamp members 23 to the gear head 12. As described below, the carrier plate 22 also functions to secure portions of the gear train in place within the gear head.

A sprocket cover 25 is mounted to the cutter bar carrier plate 22, laterally covering the inward ends of the upper and lower flights of the cutter chain 19.

A sprocket cover chip discharge opening 26 is formed in the sprocket cover 25 adjacent the inward ends of the upper and lower flights 27, 28 of the cutter chain 19. The chip discharge opening 26 is an improvement over prior chip discharges, since the location of the present opening 26 offers better chip flow and less chance that chips will clog the gear head area. To this end, the chip discharge opening 26 extends from below the lower flight 28 of the cutter chain 19 at a forward discharge opening end 29, to a rearward discharge end 30 that is approximately elevationally even with the lower chain flight 28.

Chips leaving the cutter 13 will be discharged through the opening 26, substantially clear of the closed rearward parts of the carrier plate 22 and sprocket cover 25. A greater share of the chips will thus avoid striking and accumulating against those parts and will fall clear of the cutter 13.

In the overall pruning cutter assembly, a drive motor 34 (FIG. 1) is provided at an inward end of the pole 15 for powering the cutter 13. A conventional internal combustion engine is used in the illustrated example, but other forms of engine or motor may also be used. For example, hydraulic, pneumatic, electric, or other equivalent power sources may be substituted for the illustrated engine.

An elongated drive shaft 35 (FIG. 14) is connected to the motor and extends to a remote end where it is connected to drive the cutter 13. The drive shaft 35 rotates in response to operation of the drive motor 34 about a drive shaft axis. The drive shaft 35 may be rigid as shown, or may be of a known flexible shafting. Appropriate slip fittings (not shown) are provided at opposed ends of the shaft 35 for driving connection to the motor 34 and cutter 13.

The shaft 35 extends from driving engagement with the drive motor 34 at the inward end of the assembly, to the remote end where the gear head 12 is mounted. The pole 15 encases the drive shaft 35 for rotation on a central longitudinal drive shaft axis. A "star" liner or bushing 36 (FIG. 14) is included within the pole 15 to rotatably mount the drive shaft 35. The bushing 36 is preferably formed of a low friction plastic material and may extend within the bore of the pole through nearly the full pole length.

It is further noted that the star liner bushing 36 is capable of use with either solid drive shaft rods, or with flexible, wire wound drive shafts. Thus all models of the present pruner may be produced with similar basic internal bearing structures within the elongated pole, whether the pole is to be a single length, or several interconnected lengths.

Figure 14:
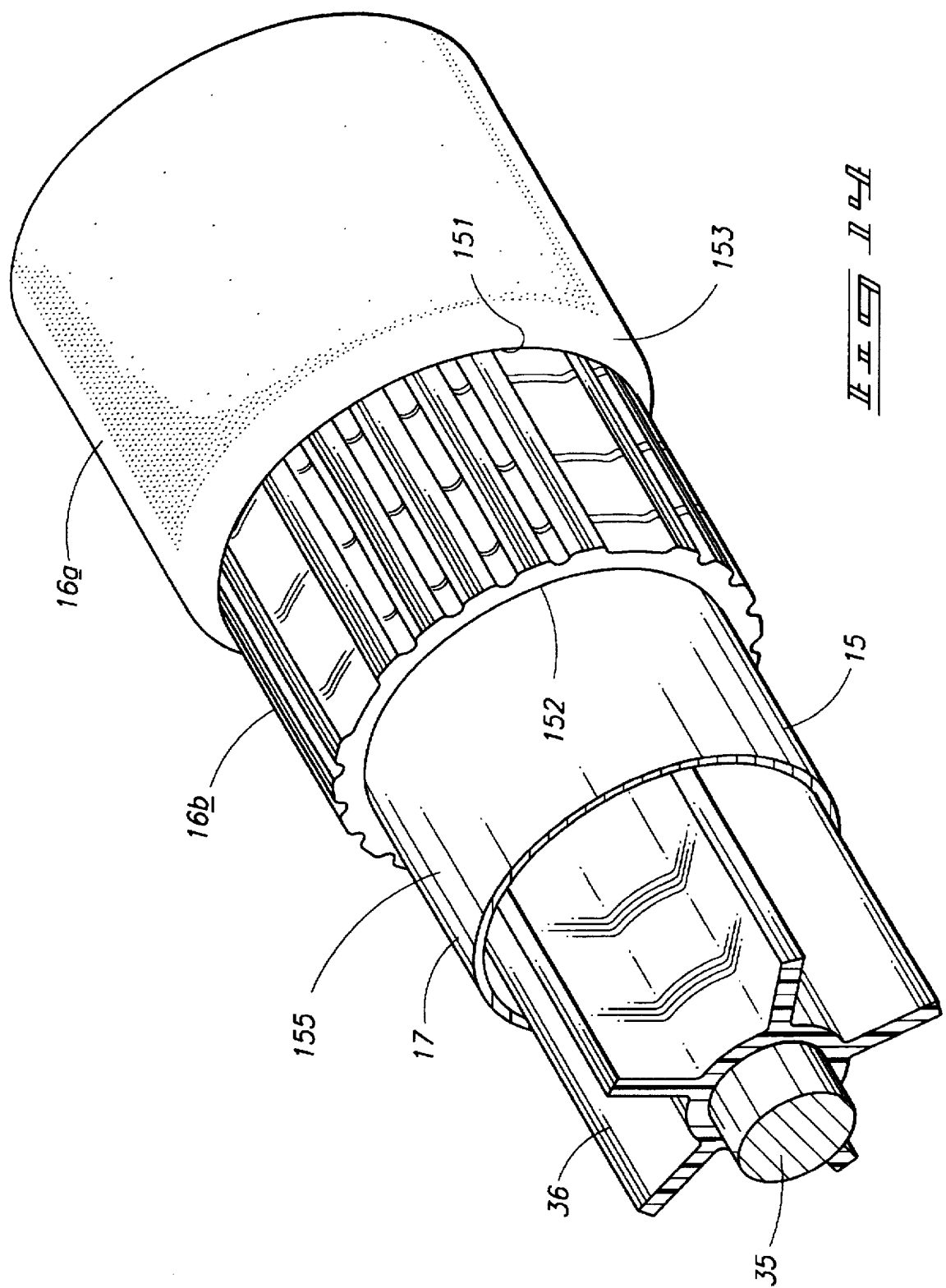
FIG. 14 is an enlarged perspective fragmentary view of a pole with sleeves mounted thereon and showing the internal drive shaft.

As shown in FIGS. 1 and 14, elongated plastic sleeves 16a and 16b are slidably received over and constricted against the pole 15 and, in the illustrated embodiment, the sleeve 16a constitutes a resilient hand grip that is slidably received over and constricted against the elongated plastic sleeve 16b. Hand controls 37 are also provided on the pole 15 adjacent the engine.

The drive shaft housing or pole 15 includes a rigid tubular member 17 (FIG. 1), formed of aluminum, plastic or other appropriate rigid tubular material. One or more of the elongated plastic sleeves 16a and 16b are slidably received over and constricted against the pole 15. Apparatus for placing such sleeves 16a and 16b are described in detail following the remaining description of the gear head 12.

It is once again pointed out that the pole 15 may be provided in a single length as shown in FIG. 14, or in several interconnectable sections (not shown) to facilitate adjustment of the overall operational length of the cutter 10. In instances where several sections are to be provided, an equal number of interconnectable drive shaft sections will be also be provided, as well as plastic sleeves.

The gear head 12 is releasably mounted at the outward end of the pole 15 and is drivingly connected to the drive shaft 35. The head 12 is simply secured by provision of a releasable mount 40 that permits relatively easy removal of the gear head 12 and cutter components from the drive shaft 35 and drive shaft housing 15. The mount 40 may simply comprise a socket 41 at an end of the gear head 12, for receiving the end of pole 15, and a set screw 42 on the head 12 that can be turned to clamp the head 12 to the pole 15.

The gear head 12 includes a gear housing 45 formed of two housing halves, a cutter mounting half 46 and a cap half 47. The cutter mounting half 46 and cap half 47 are in, one preferred form, produced from a rigid injection molded plastic.

It is of special interest to note the plane along which the halves are joined (FIGS. 6–11). The halves 46, 47 are joined along mating flanges 48, 49 along a plane that is substantially normal to the rotational axis for the cutter arbor shaft 52.

The external surface of the cap half 47 provides an integral, undivided pocket structure 54 (FIG. 11) for mounting a bearing or bushing 55 for the cutter arbor shaft 52. Likewise, the cutter mounting half 46 provides a complete, undivided and braced bearing pocket 56 for a cutter arbor bearing 57 (both bearings being described below).

This is an improvement over the prior gear head disclosed in U.S. Pat. No. 5,013,282 in which the gear housing was split in a plane parallel with the arbor shaft, thereby dictating that the socket for the arbor bearing be produced in sections. While the '282 arrangement operates adequately, extended operation of the device can cause eventual slight separation of the halves, loosening the bearing and resulting in bearing wear.

In the presently preferred gear head 12, the housing halves 46, 47 are clamped together, forming an enclosure for the internal gears and shafting. Part of the formed enclosure is utilized as a grease sump 60 receiving a gear 61 and pinion 62 that will be described in greater detail below.

Referring to FIGS. 7–10, a seal member 64 (FIGS. 9, 10) is situated between the cap half 47 and cutter mounting half 46 extending about the grease sump 60. The seal member 64 terminates at ends 65 that are in sealed abutment with one of two pinion bearing 67, 68 that are captured within journal box halves 70, 71 on each of the respective housing halves 46, 47 (FIG. 11).

Figure 7:
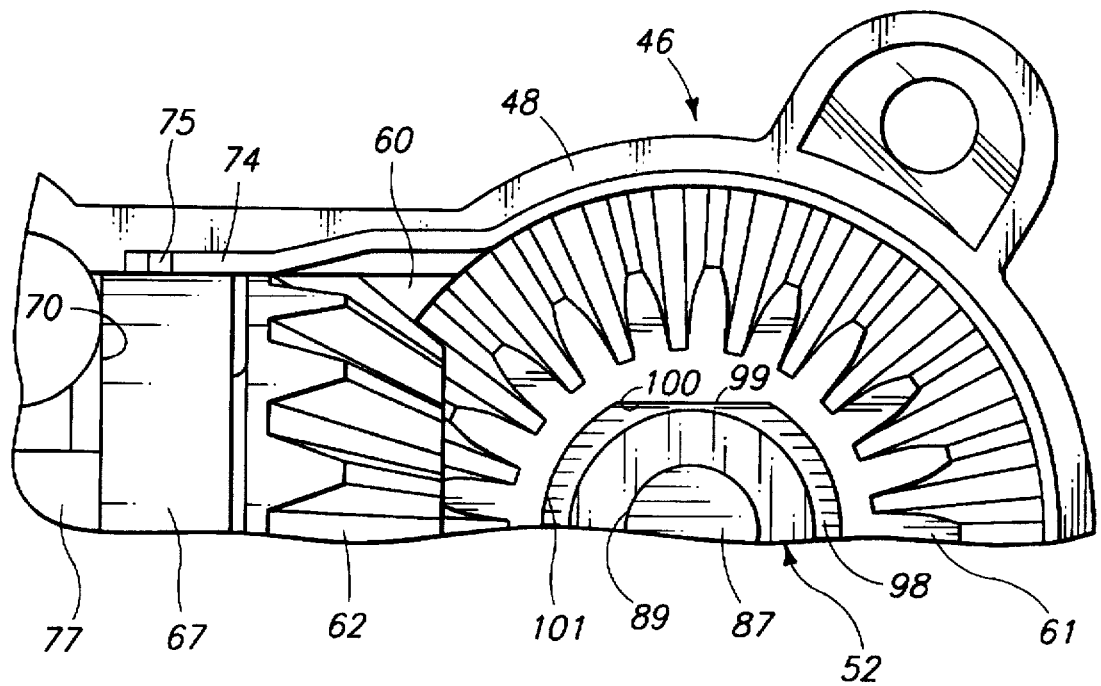
FIG. 7 is an enlarged fragmented sectional view showing part of an "O" ring engaging flange on the cutter mounting half of the gear head.
Figure 8:
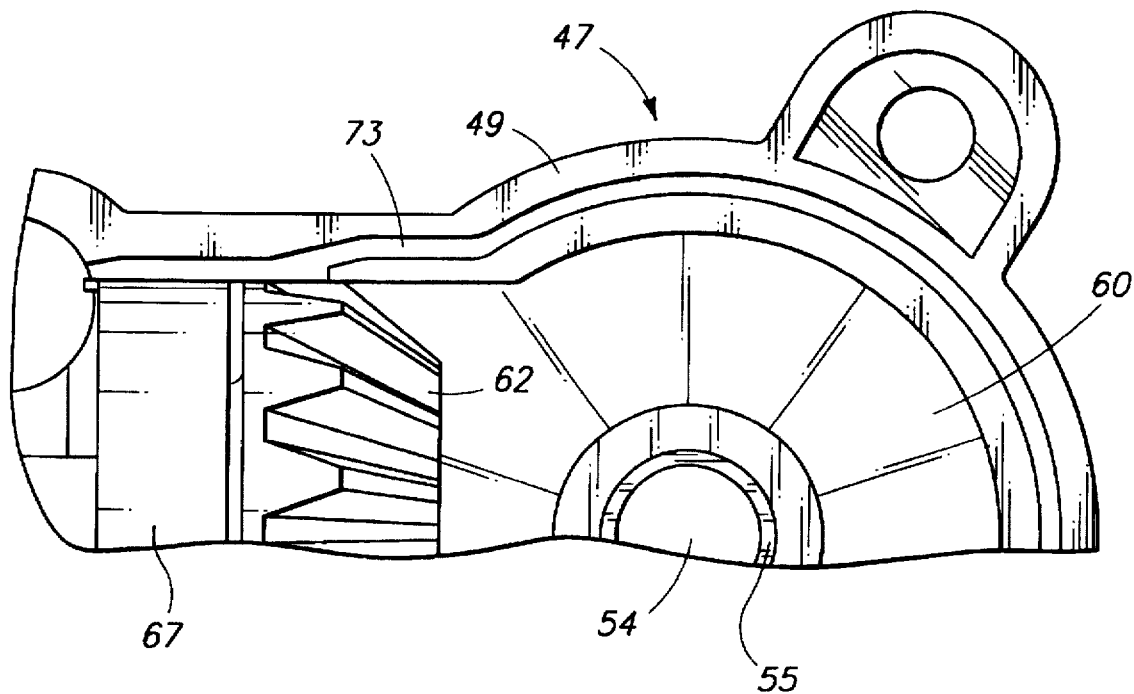
FIG. 8 is a detail view showing part of an "O" ring receiving groove in the cap half of the gear head.

The seal member 64, in the example illustrated is a conventional "o" ring bearing stock strip, received within a formed groove 73 in one of the housing halves (FIG. 8), and a mating flange or ridge 74 formed in the other housing half (FIG. 7).

Figure 9:
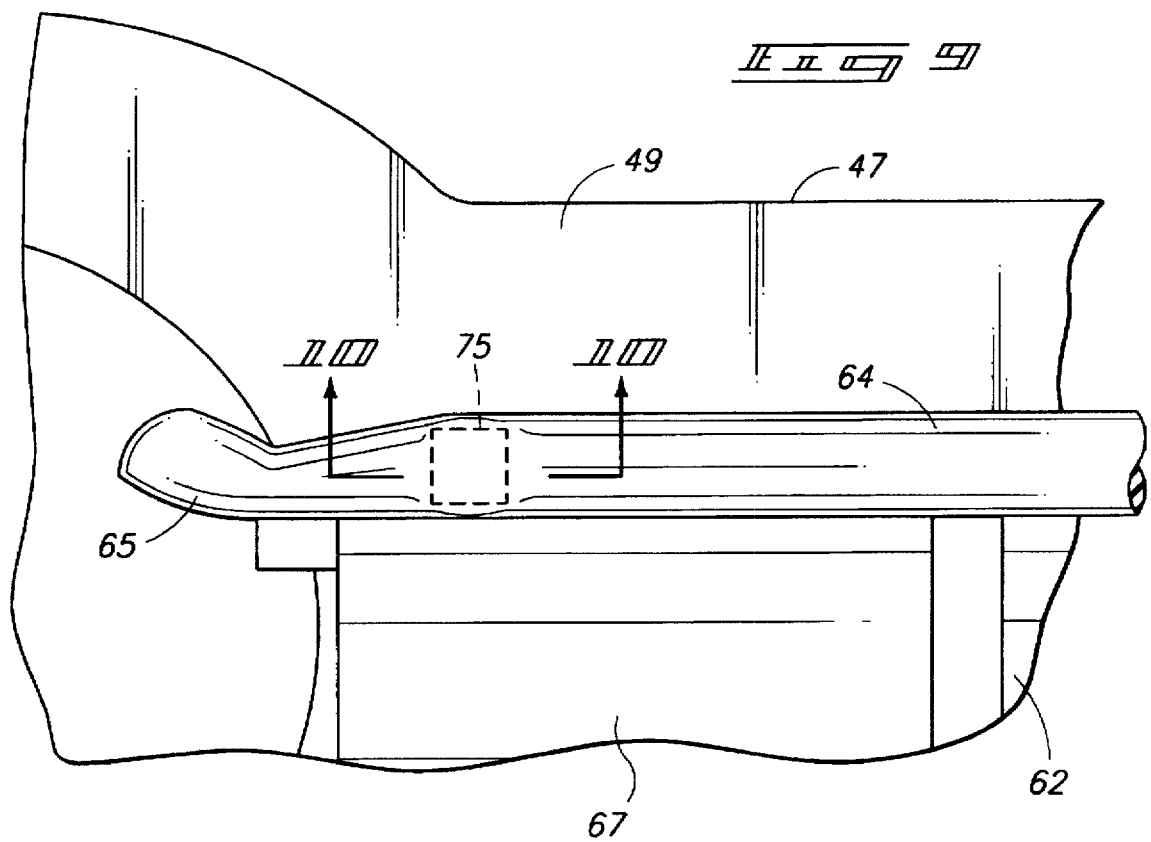
FIG. 9 is an enlarged fragmented view showing displacement of an "O" ring segment against a bearing surface.
Figure 10:
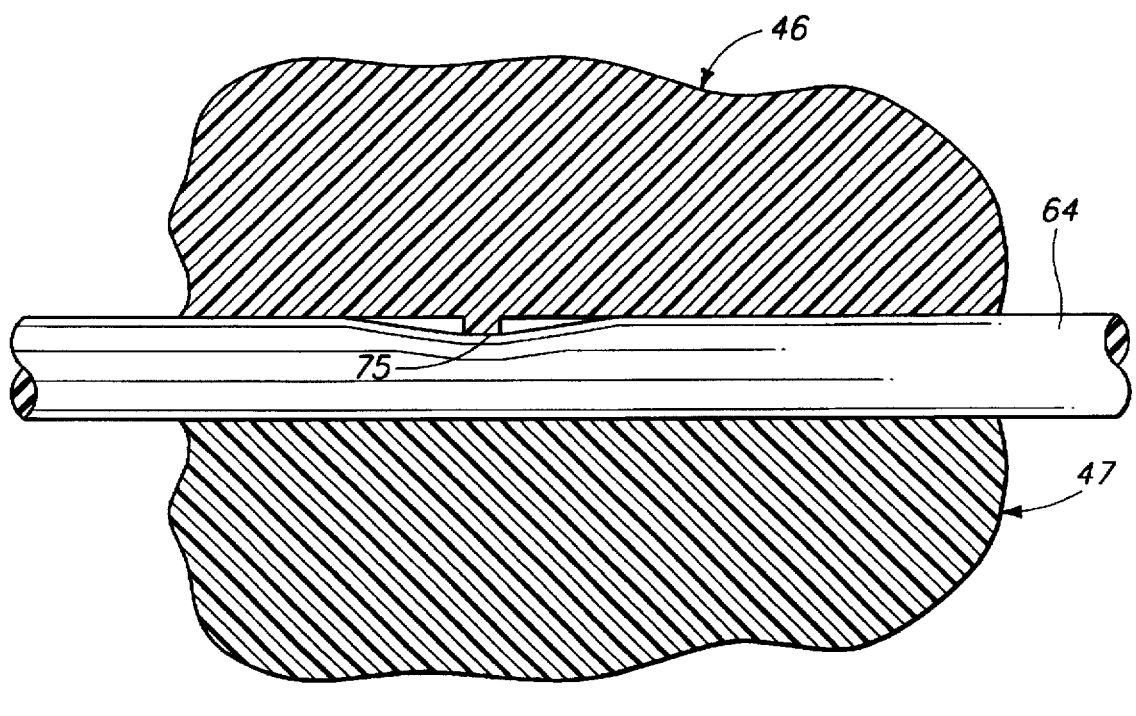
FIG. 10 is a sectional view taken along line 10—10 in FIG. 9.
Figure 11:
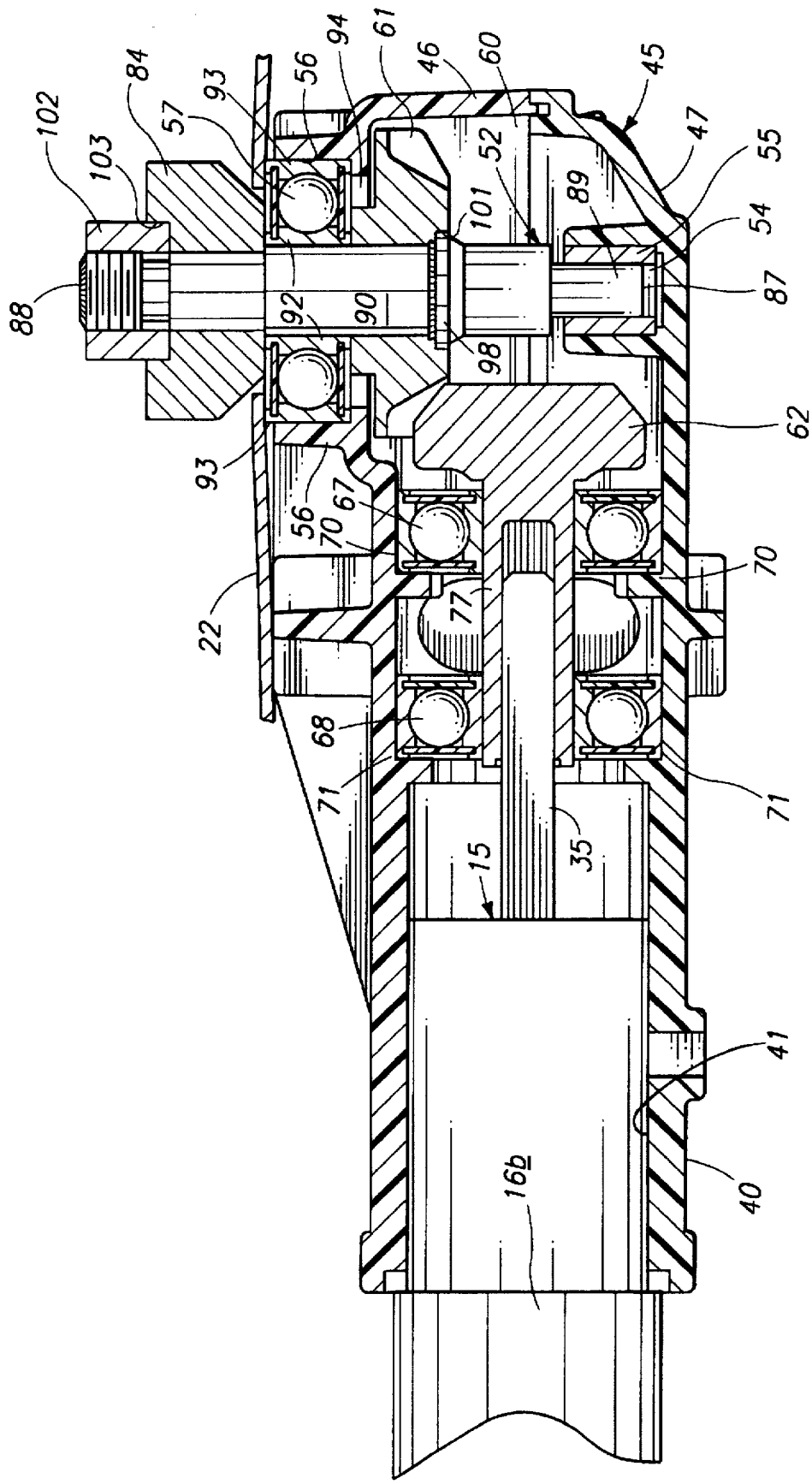
FIG. 11 is a fragmented sectional view through the assembled gear head taken from the direction indicated at 11—11 in FIG. 6.

Seal member compression surfaces 75, one of which is shown in FIGS. 7, 9, and 10) are provided on one of the housing halves adjacent the pinion bearing 67. The compression surfaces 75 are positioned on the housing half 46 to engage and compress the ends of the seal member 64 against the pinion bearing 67. This creates a seal against the bearing 67 and within the formed groove 73 to prevent escape of grease from the sump 60. The bearing 67 is preferably a sealed bearing and so provides a functional seal between the housing halves 46, 47 and pinion shaft 77, thereby effectively closing the sump 60 and preventing leakage.

The clamp members 23 (FIG. 3) join and securely fasten the housing halves together with clamping forces substantially parallel to the cutter arbor shaft axis. The clamp members 23 also function to secure the cutter carrier plate 22 (FIG. 5) to the gear head 12 and clamp the arbor bearing 57 against the gear head 12 as shown partially in FIG. 11.

Two gears 62, 61 are in meshing engagement within the grease sump with gear shafts extending at approximate 90° angles to one another. The gears 62, 61 themselves are bevel gears and may provide mechanical gear reduction or speed increase as needed according cutter speed and arbor shaft torque requirements.

The pair of pinion bearings 67, 68 are located within the journal box halves 70, 71 which are formed to receive and clamp the pinion bearings in position coaxial with the drive shaft. These bearings rotatably mount the pinion shaft 77 which is integral with the pinion gear 62.

The pinion 62 is a bevel gear, mounted at an end of pinion shaft 77. The pinion 62 is held in meshing engagement with an arbor gear 61 that rotates on an axis normal to the drive shaft axis.

The cutter arbor shaft 52 briefly discussed above, mounts the arbor gear 61 and extends outwardly of the gear head 12 to mount a cutter driver, such as the chain sprocket 84 shown in section in FIG. 11.

The arbor shaft 52 includes an inside end 87 and an outside end 88. A first journal 89 is formed on the arbor shaft 52 at its inside end 87. A second journal 90 is formed along the arbor shaft 52 between the inside and outside ends 87, 88.

The bushing 55 is mounted within the cap half 47 of the gear head, rotatably receiving the first journal 89. A cutter arbor shaft bearing 57, preferably a sealed ball bearing as briefly mentioned above is mounted within the bearing pocket 56 formed in the cutter mounting half 46 of the gear head. In a preferred form, the cutter arbor shaft bearing 57 includes an inner race 92 and an outer race 93 mounting the cutter arbor shaft at the second journal 90.

The cutter arbor shaft bearing 57 and bushing 55 hold the gear 61 in meshing engagement with the pinion 62 for rotation about the cutter arbor shaft axis. This axis is angularly oriented, preferably normal to the plane along which the gear housing halves 46, 47 are joined.

The cutter arbor shaft bearing 57 projects axially (FIG. 11) with respect to the cutter arbor shaft axis beyond the cutter mounting half 46. This is done so the cutter carrier plate 22 may be used to securely clamp the bearing outer race 93 axially (with respect to the cutter arbor shaft axis) against a shoulder 94 formed within the bearing pocket 56 as shown in FIG. 11. The inner race 92 of the bearing 57 is clamped between the gear 61 and the driver or sprocket 84.

Figure 13:
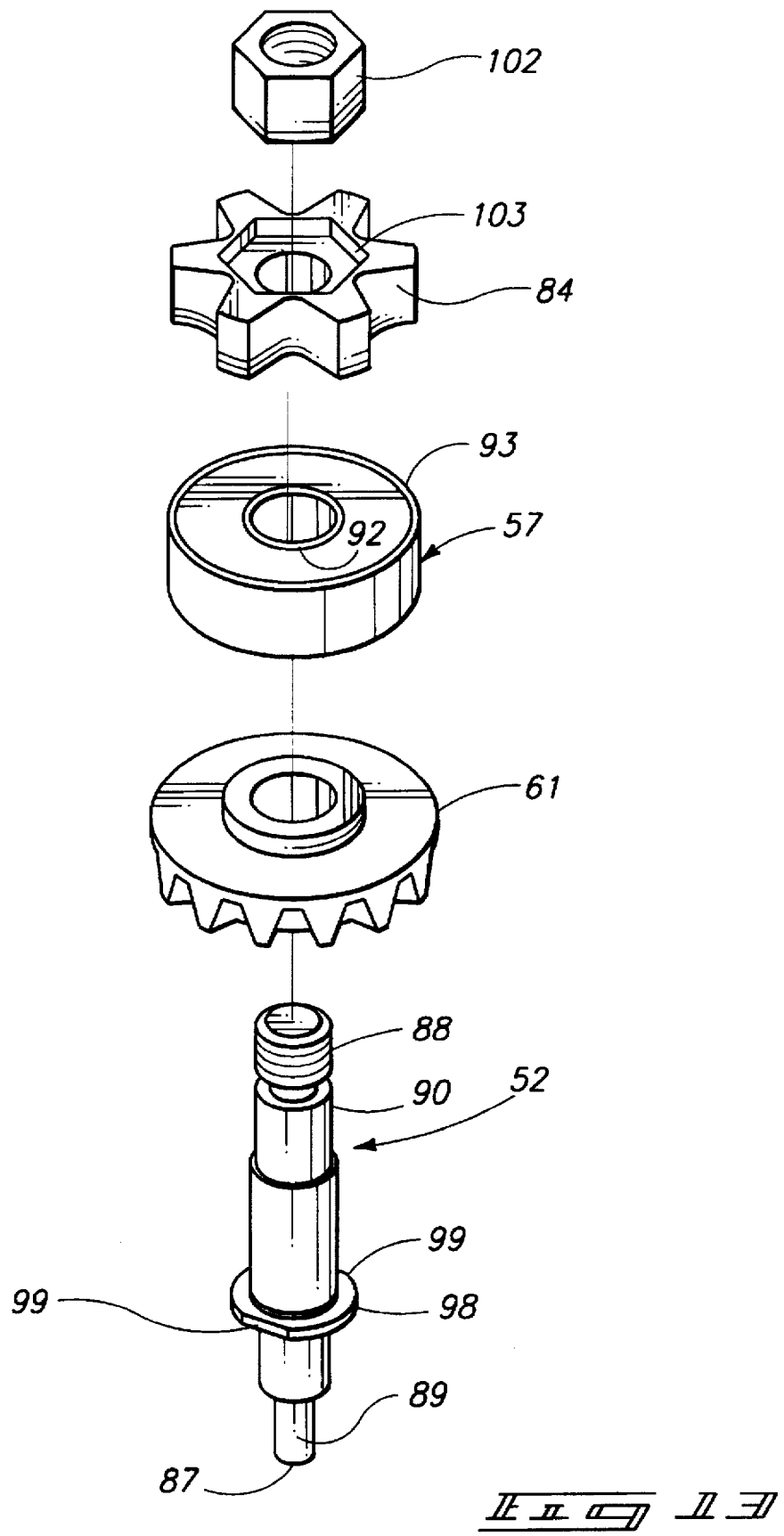
FIG. 13 is an exploded perspective view of the arbor shaft and elements mounted thereto.

A novel arrangement is provided for securing the assembly including the gear 61, the cutter arbor shaft 52, the cutter arbor shaft bearing 57 and the cutter driver or sprocket 84 to the gear head 12. This arrangement is best viewed with reference to FIGS. 6, 11 and 13.

The gear 61 slides axially onto the cutter arbor shaft 52 and seats against a flange 98 that includes flats 99. The flats 99 mate with complimentary flats 100 formed in a recess within the gear such that the gear 61 is allowed to slide onto the cutter arbor shaft 52, but will not rotate (relative to the arbor shaft) once engaged with the flats 99. The flange 98 also stops further axial sliding of the gear 61 toward the inside shaft end 87.

The outward end 88 of the cutter arbor shaft 52 is threaded to receive a nut 102. A nut locking recess 103 formed in the hex shape of the nut is provided in the outward surface of the driver sprocket, and the sprocket itself slides axially onto the cutter arbor shaft 52. The nut 102 is mounted to the cutter arbor shaft 52 to operatively clamp the sprocket 84 axially against the inner race 92 of the cutter arbor bearing 57 to the gear 61 on the arbor shaft 52. The nut 102 is received in the nut locking recess 103 so the sprocket 84 is effectively locked to the nut 102 and will turn with the cutter arbor shaft 52 when clamped against the inner race 92 of the bearing 57.

The other side of the inner bearing race 92 is clamped by the gear 61. Thus the assembly, including the sprocket, bearing, and gear are all fixed axially in position relative to the cutter arbor shaft simply by operation of the nut 102. This avoids expense in manufacturing by eliminating the need to fix the various parts in position on the cutter arbor shaft 52, either by machining, press fitting, or other precision methods, and makes assembly and disassembly an easy procedure.

Assembly of the gear head 12 is easily accomplished with the above components. After the bearings 67, 68 have been pressed onto the pinion shaft 77, the assembly is mounted to the cap half 47 simply by inserting the bearings in the complimentary journal box halves 70, 71.

Now the assembler may slip the gear 61 over the arbor shaft 52 and rotate either until the flats 99 on the arbor shaft flange 98 slide into locking engagement with the complimentary recess 101 formed in the gear 61. The assembled arbor shaft and gear can be placed with the gear 61 and arbor shaft 52 in the cap half 47 with the first journal 89 seated in the bushing 55, and the gear 61 meshing with the pinion 62.

Grease or other appropriate lubricant is placed or has been previously placed within the sump area 60 and an "o" ring seal member 64 is placed within the formed groove 73 in one of the gear housing halves. The arbor shaft bearing 57 may be placed in the bearing pocket 56 formed in the cutter mounting half 46 of the housing 45. The cutter mounting half 46 may now be mounted to the cap half 47 of the housing 45 following placement of the bushing 55 in the bushing pocket 54. This is done using appropriate clamp screws 23 (FIG. 5) and nut combinations fitted through aligned holes in the gear housing halves 46, 47.

The carrier plate 22 is simultaneously attached, being first loosely positioned with the clamp screws 23 before the housing halves are assembled. The clamp screws 23 are turned to clamp the housing halves together, pressing the "o" ring seal member 64, especially in the area adjacent the seal member compression surfaces 75 (FIGS. 9, 10) against the bearing 67 to seal the grease sump 60.

The clamped housing halves and carrier plate 22 will hold the bearings 67, 68, 57 secure, which in turn will rotatably hold the gears 61, 62 in meshing engagement. The arbor shaft 52 will extend outwardly through the arbor shaft bearing 57 to receive the sprocket 84 and nut 102.

The clamp screws 23 are further used to clamp the cutter carrier plate 22 against the gear housing. A portion of the plate 22 presses against the outer race 93 of the arbor shaft bearing 57, holding the bearing 57 securely within the bearing pocket 56.

Now the sprocket 84 and nut 102 may be mounted. The sprocket 84 is simply slid over the exposed outer end 88 of arbor shaft 52, against the inner race 92 of the arbor shaft bearing 57. The nut 102 is threaded onto the threaded portion of the arbor shaft 52 and fitted into the socket 103 formed in the sprocket 84. This effectively locks the sprocket 84 to the arbor shaft 52, and pulls the bevel gear 61 firmly against the inner race 92 of the arbor shaft bearing 57.

As a further note, the threads at the outward end 88 of the cutter arbor shaft 52, and the nut threads are turned so that the normal rotational direction of the cutter arbor shaft 52 during operation will tend to tighten the nut 102 and increase the axial clamping tension on the inner race 92 the bearing 57. Thus, there is no chance that the nut 102 will accidently become dislodged during operation.

Now the cutter bar 18 and cutter chain 19 (FIGS. 4, 5) may be mounted to the cutter mounting plate 22. This is done in a conventional manner, using studs 105 and nuts 104 provided on the cutter mounting plate to mount the bar. The cutter chain 19 is now loosely attached to the bar 18 and sprocket 84.

The sprocket cover 25 may now be clipped to the cutter mounting plate and attached by a screw 106 (FIG. 4). The cover 25 includes the conventional chain tensioning features 20 that interact with the bar 18 to facilitate adjustment of cutter chain tension.

Figure 12:
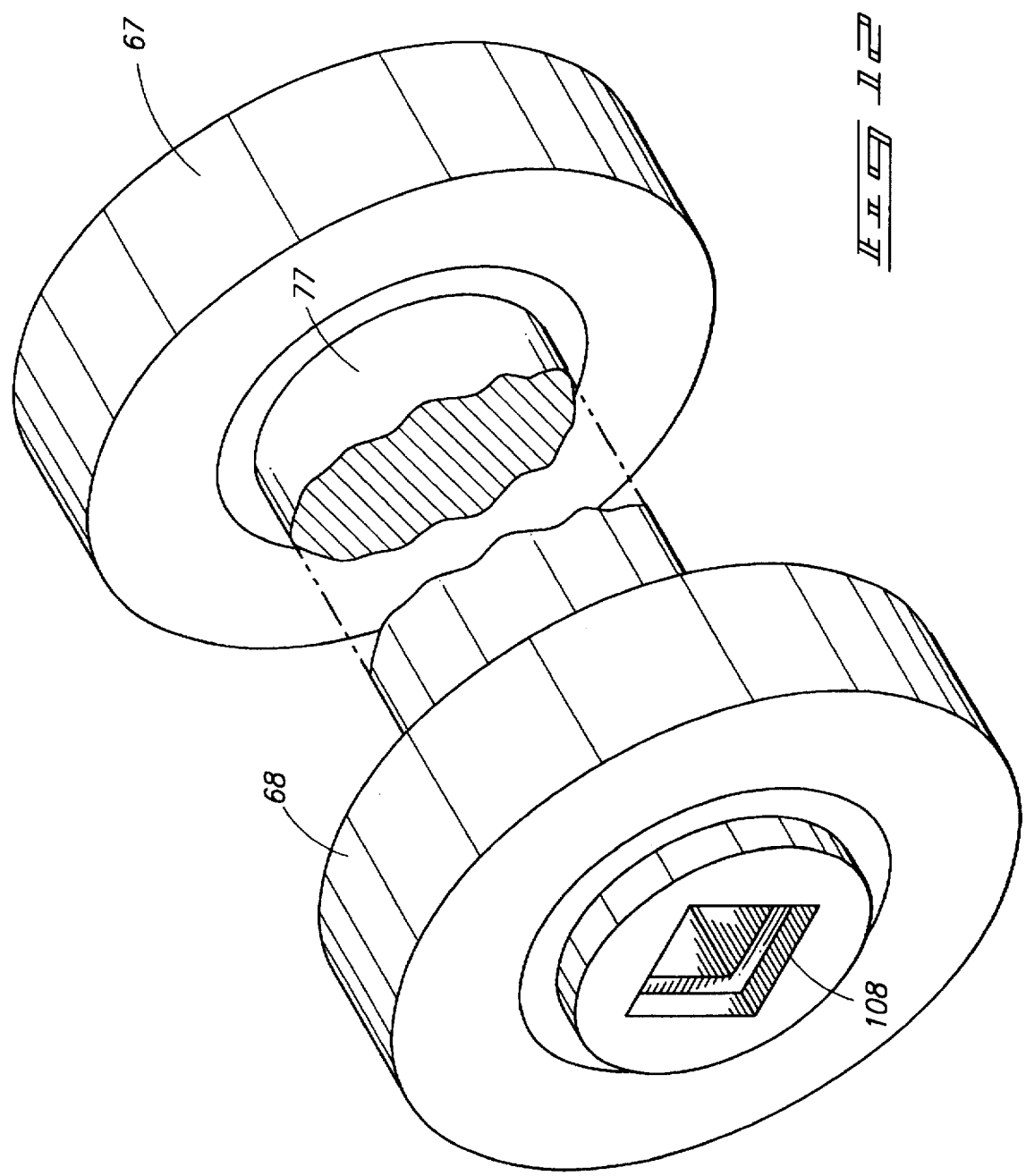
FIG. 12 is an enlarged fragmented perspective view showing a driving connection for the pinion shaft and associated bearings.

To aid in disassembly of the above components for replacement or repair, special provision is made within the gear head 12 to facilitate removal of the nut 102 and sprocket 84. To this end, a special socket 108 (FIG. 12) is formed within the pinion shaft 77. The socket 108 is shaped to receive the standard ¼" drive extension of a conventional socket type wrench (not shown). To remove the nut 102, one simply inserts the driver of a socket wrench in the socket 108 to hold the gear train steady, then attaches a wrench to the nut 102 to facilitate its removal. Once the nut 102 is removed, the sprocket 84 is easily removed.

In one preferred form (FIGS. 3, and 15–18), the present pruner 10 cutter also includes a cutter oiler 115 mounted on the back side of the cutter mounting plate 22. The oiler 115 is provided to enable selective lubrication of the cutter, especially in the instance as illustrated where a chain saw form of cutter is used.

The oiler 115 includes a reservoir 116 as generally shown in FIG. 3 that in one preferred form is constructed of a transparent or semi-transparent oil-impervious plastic material. The reservoir 116 mounts to the plate 22 by appropriate mounting screws or equivalent fasteners 117 (FIG. 3).

An access plug 120 is provided on the reservoir 116, and is removable to permit filling the reservoir with oil. An oil metering cup 121 is provided within the reservoir 116 with an open top end 122 positioned to be filled with oil responsive to inversion of the reservoir 116 as shown in FIGS. 15–17. The cup 121 is held by brackets 123 within the reservoir 116 in a normally upright condition. The cup 121 will not spill over with the cutter held in a normal upright operating orientation, but may be filled by tipping the reservoir as shown in sequence in FIGS. 15–17. Oil thus gathered within the metering cup 121 is allowed to drain outwardly to the cutter 13.

An oiler tube 125 openly communicates with the oil metering cup 121 and extends from the cup 121 to a remote end adjacent the cutter 13. Oil within the cup is free to flow by gravity through the tube 125 and onto the cutter 13. In one preferred form, the tube 125 is formed of a flexible plastic, inserted through a hole 126 formed in the bottom of the cup. The fit between the hole and tube is such that a relatively tight fit is achieved, preventing oil seepage between walls of the hole and tube. However, there is no securing forces other than friction to hold the tube in place. The tube may thus be forcibly moved to locate its open end 127 (within the metering cup 121) at a selected distance from the top cup edge 122. Such adjustment allows for selection of the amount of oil delivered through the tube for each filling of the cup 121.

The oiler tube 125 exits the reservoir 116 through a formed opening 128 in the reservoir wall. This opening is selected to be slightly smaller than the outside diameter of the tube 125, so the resulting fit substantially seals against leaks from the reservoir interior. The outer end 130 of the tube leads through the cutter carrier plate 22 to a position adjacent the blade such that oil may drip from the tube end onto the cutter chain.

A vent chamber 133 (FIGS. 15–17 and in detail in FIG. 18) is formed within the reservoir 116, including a breather opening 134 leading to the external environment, and an internal vent opening 135 leading into the reservoir 116. In a preferred form, the internal vent opening 135 is formed as an elongated slit in the vent chamber 133 leading from the vent chamber 133 into the reservoir. The cross sectional area of the internal vent opening 135 is larger than the cross sectional area of the breather opening 134.

The above relationship enables ventilation of the reservoir to permit discharge of oil through the tube 125, yet does not permit sufficient ventilation to readily allow oil to spill from the breather opening 134 during the time it takes for the cup 121 to be filled when the reservoir 116 is tipped. Further, the breather opening 134 is tapered, as shown in FIG. 18, with the larger opening to the inside sized for the preferred chain oils such that the slight negative pressure created by the oil flowing from the metering cup will break the surface tension film that can form and stop air from entering the reservoir chamber. Conversely the smaller outside opening resists oil flow to the outside to a greater degree.

SLEEVE EXPANSION APPARATUS

FIGS. 19–34 show preferred features of a sleeve expansion apparatus 150 for preparing an elastomeric sleeve 16a or 16b to be fitted over the pole 15 or other shaft. Two forms of the expansion apparatus are described. A first form is shown in FIGS. 19–24 and a second form is shown in FIGS. 25–34.

Two forms of elastomeric sleeves are shown. A first sleeve 16a is formed of a soft, resilient material such as neoprene or similar elastomeric, porous material, in relatively short sections that are placed on the elongated pole 15 to provide hand grip surfaces. A second sleeve 16b is an elongated plastic tube that is intended to substantially cover the full length of the pole 15. The taper preferably runs from the enlarged end which approximates the diameter of the tubular member 172, substantially tangential to the tubular member, to a reduced end approximating the diameter of the mandrel 160a. The taper is preferably a smooth curve to provide a smooth transition for expanding the elastomeric sleeve 16a from the mandrel onto the tubular member 172.

In either form, the sleeve 16a, 16b generally includes an internal bore 151, 152 leading from a sleeve end 153, 154 for installation over the elongated shaft. The shaft or pole 15 will typically include an external sleeve receiving surface 155 (FIG. 14) of a cross sectional dimension greater than that of the internal bore of either sleeve 16a or 16b.

In the illustrated examples, both sleeve forms include bores 151, 152 that extend completely through the sleeve length and open at opposite sleeve ends. However, either form of apparatus described below could be made to operate using sleeves that are open only at one end.

In general, both exemplified sleeve installation apparatus include an elongated rigid mandrel 16a, 16b receivable within the bore 151 or 152 of the elastomeric sleeve 16a or 16b, for movably supporting the elastomeric sleeve (FIG. 14).

Both forms of apparatus 150 also include an air discharge fitting 162a, 162b mounted to the mandrel 160a, 160b and engageable with one end of a sleeve presently mounted on the mandrel. The air discharge fittings 162a, 162b include at least one air discharge 165a, 165b opening into the bore of the selected elastomeric sleeve. A pressurized fluid directed through the discharge 165a or 165b can be used to expand the associated sleeve 16a, 16b and increase its bore to a size sufficient to enable the elastomeric sleeve to be slid axially over the elongated shaft or pole 15.

Referring now in more detail to FIGS. 16–21 the first apparatus 150 is shown for assisting installation of the elastomeric sleeves 16a. The mandrel 160a in this form is comprised of a rigid rod 170 pivotably connected at one end to a supportive frame 171. The rod 170 swings about the pivot axis from the horizontal position shown in solid lines in FIG. 19, to the dashed line position. Mandrel 160a is provided to loosely receive and support a sleeve 16a.

Figure 24:
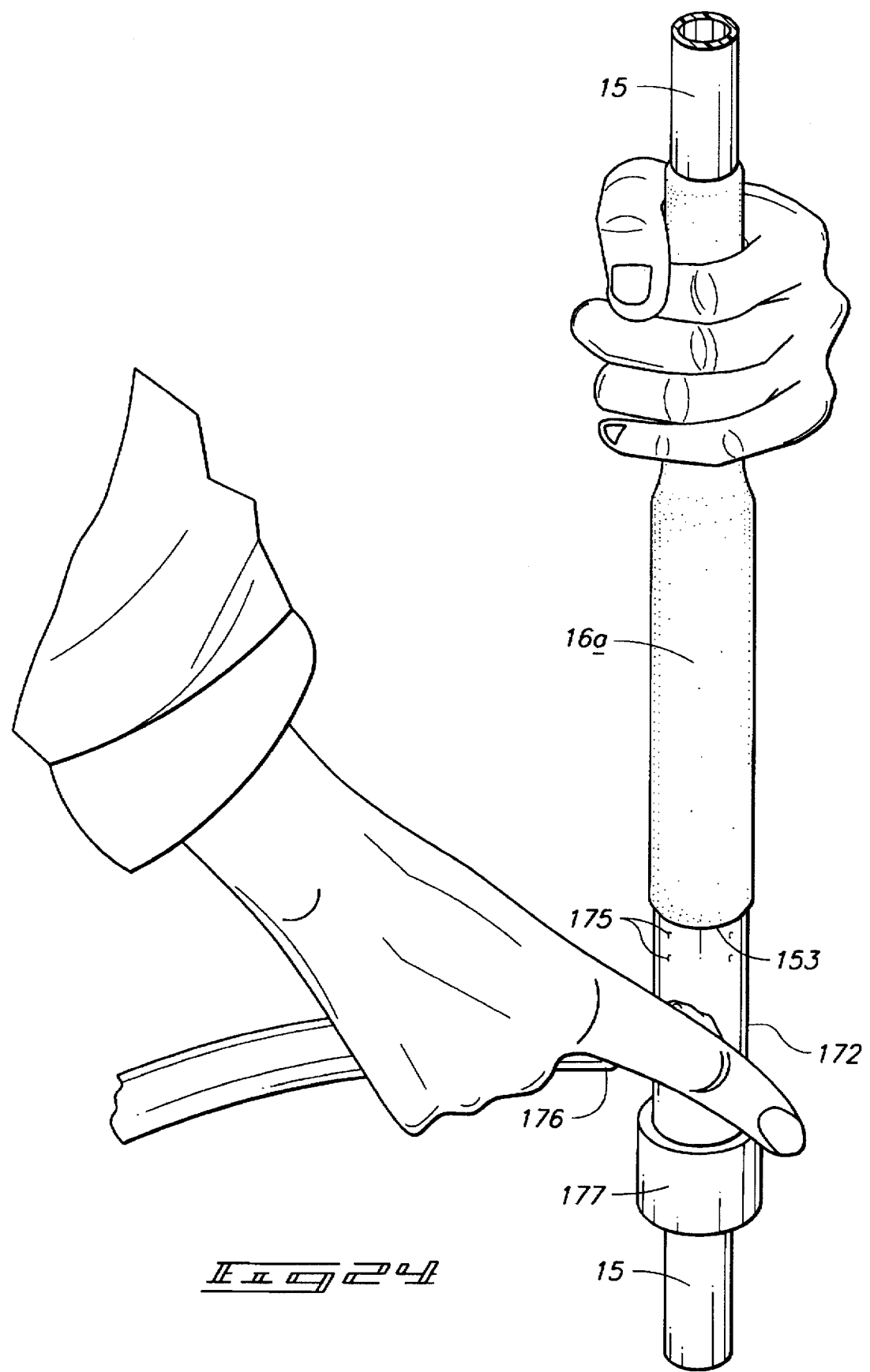
FIG. 24 is a view showing the sleeve being applied to a pole by retraction of the tubular member.
Figure 25:
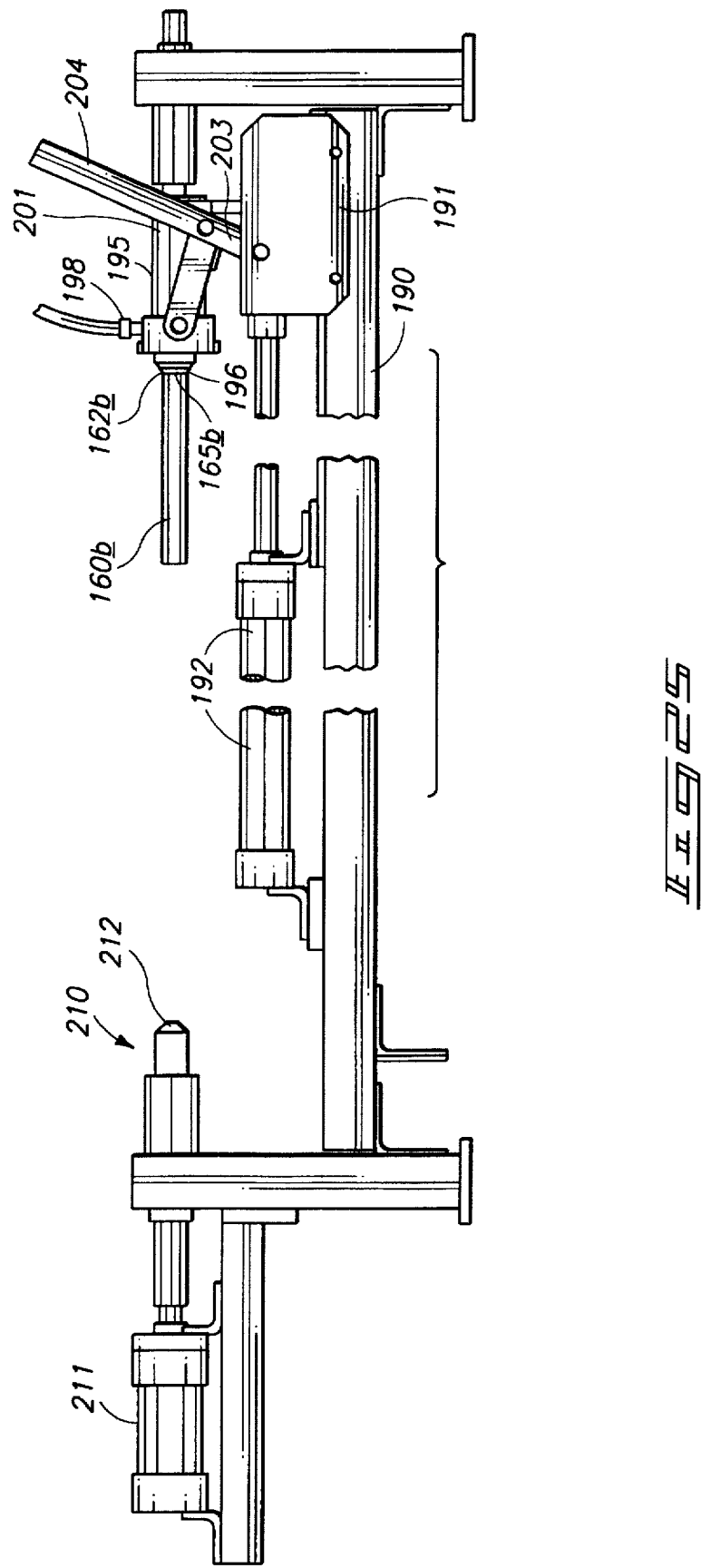
FIG. 25 is a fragmented side elevation view of another form of elastomeric sleeve expansion device.

A tubular member 172 is also provided. Member 172 includes an elongated outer surface 173, and an internal bore 174 of greater cross sectional dimension than that of the external sleeve receiving surface of the elongated shaft or pole 15. The tubular member 172 may thus be slidably positioned over the elongated shaft or pole 15 as shown in FIG. 24, with the shaft or pole being received within the internal bore 174 of the tubular member 172.

The tubular member 172 in one preferred form is a single walled pipe, with a plurality of holes 175 (FIGS. 20, 22) formed along its length for passage of compressed fluids. The tubular member 172 is slightly longer than the sleeve 16a, and includes a fitting 176 (FIGS. 19, 23) adjacent one end for attachment to a source of fluid pressure (not shown) such as a conventional air compressor. The opposed ends of tubular member 172 are open to permit passage over the pole. One tube end includes a shoulder 177 for sealing engagement with an abutment surface 178 (FIG. 19) provided on the frame 171 substantially as shown in FIG. 16.

The air discharge fitting 162a in this embodiment preferably includes a porous cap 180 (FIGS. 19, 20) is removably mountable between the tubular member 172 and mandrel 160a. The porous cap 180 includes a tapered outer surface 181 leading from an enlarged end 182 adjacent the tubular member 172 to a reduced end 183 adjacent the mandrel 160a. The frame 171 supports the mandrel, tubular member, and porous cap in axial alignment.

The fluid fitting 176 (FIG. 19, 23) on the tubular member 172 is adapted for connection to a source of fluid pressure for delivering fluid under pressure through the internal bore of the tubular member 172 and through the porous cap 180. The discharged fluid produces a fluidized bed of low frictional resistance along the tapered outer surface of the porous cap over which the elastomeric sleeve may be slid axially from the mandrel 160a and onto the tubular member 172.

The porous cap 180 is equivalent to the air discharge fitting 162a, and the small air passages formed within the cap are equivalent to the discharge 165a opening into the bore of the elastomeric sleeve. In this embodiment, the cap 180 may be formed of sintered metal with open interstices forming the air discharge openings. Alternatively, the fitting could be formed of porous plastic with natural porosity, or such porosity could be formed in another manner such as by drilling small holes through the cap into a hollow core.

Figure 20:
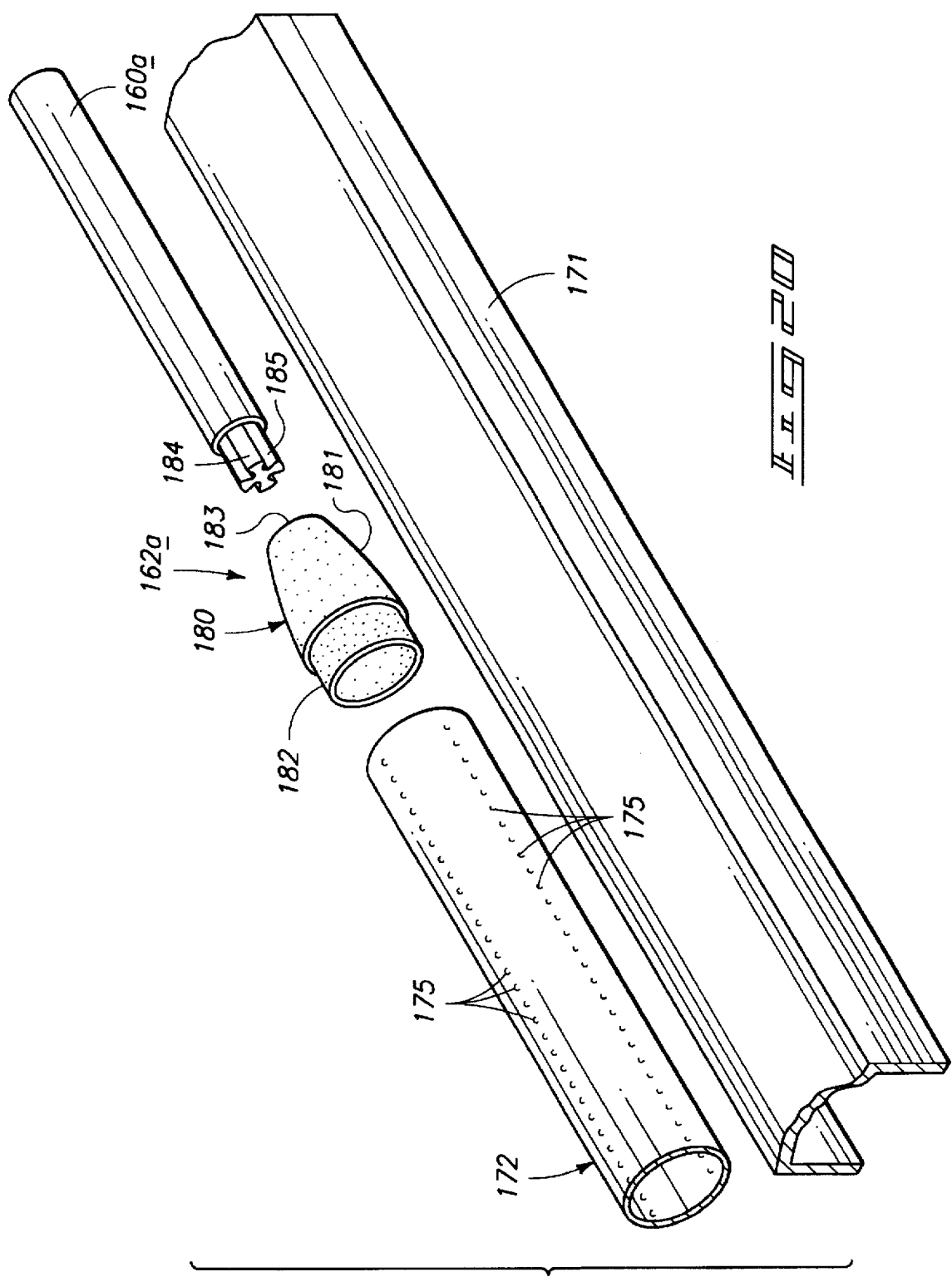
FIG. 20 is an exploded fragmentary view of parts comprising the sleeve expansion apparatus shown in FIG. 19.
Figure 21:
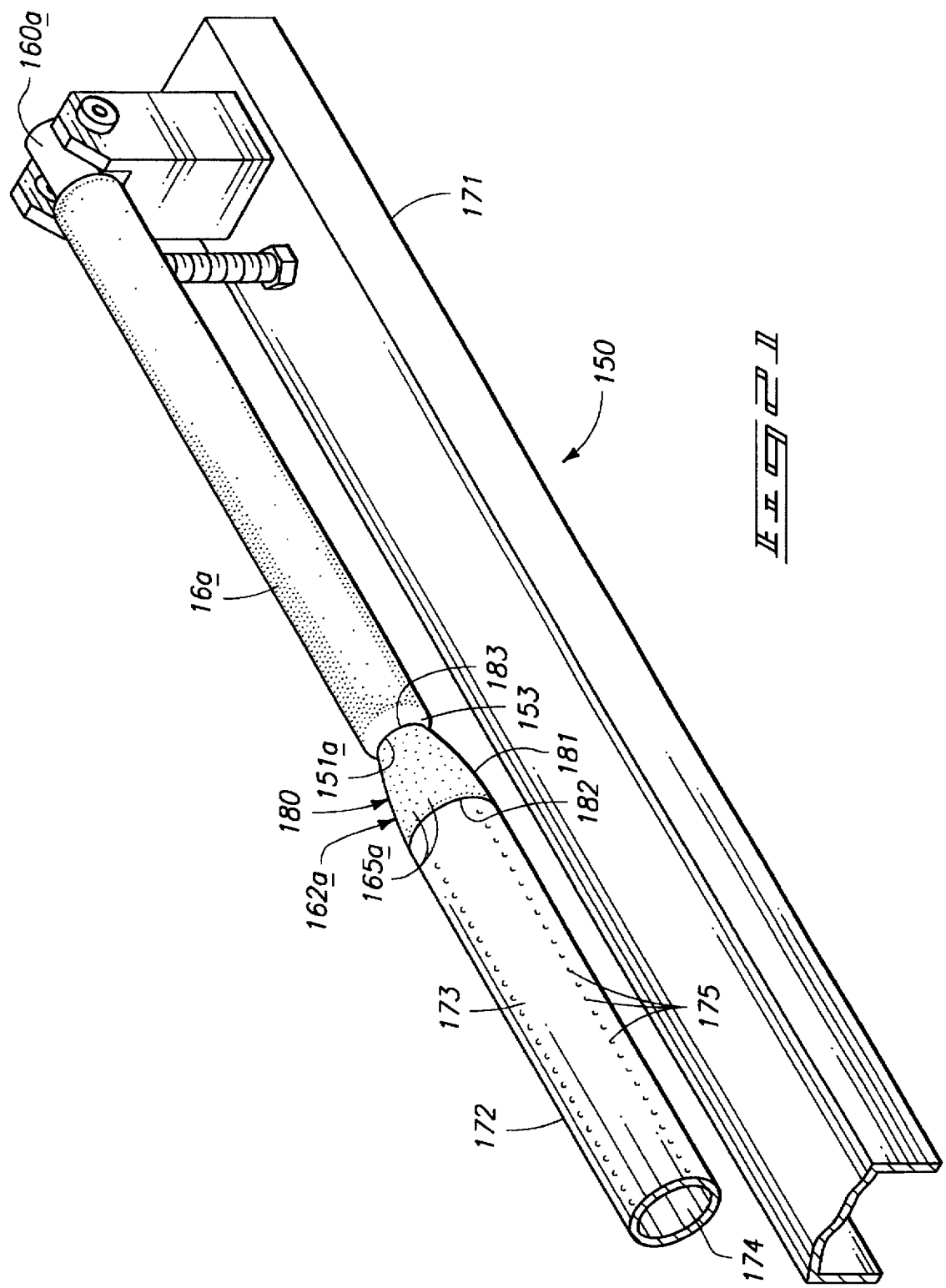
FIG. 21 is a view similar to FIG. 19 only showing an elastomeric sleeve positioned on the mandrel thereof.

As shown in FIG. 20, the cap 10 is hollow, with the enlarged end 182 shaped to be releasably received within an end of the tubular member 172. The reduced end 183 is adapted to be received over a slotted end 184 of the mandrel 160a. Slots 185 formed in the mandrel end permit fluid passage through the pores at the reduced end of the cap.

To further ease movement of the sleeve from the mandrel 16a onto the tubular member 172, the plurality of small apertures 175 serve to bleed pressurized fluid from the tubular member to maintain the fluidized bed condition, reducing friction as the sleeve is moved onto the tubular member 172.

The steps taken to use the above described apparatus is used to assist placement of an elastomeric sleeve over a shaft may best be understood with reference to FIGS. 21–24.

As a first step, an elastomeric sleeve 16a is placed over the mandrel 160a. This is done by tipping the mandrel 160a upwardly on its pivot (see dashed lines in FIG. 19) and simply slipping the sleeve over the mandrel length.

Next the reduced end of the porous cap 180 is placed over the mandrel end. The tubular member 172 is then attached to the enlarged end 182 of the fitting. Now the assembled unit including the mandrel 160a, sleeve 16a (shown dashed in FIG. 19) and tubular member 172, may be pivoted downwardly to seal the shoulder 177 of the tubular member against the frame.

Figure 22:
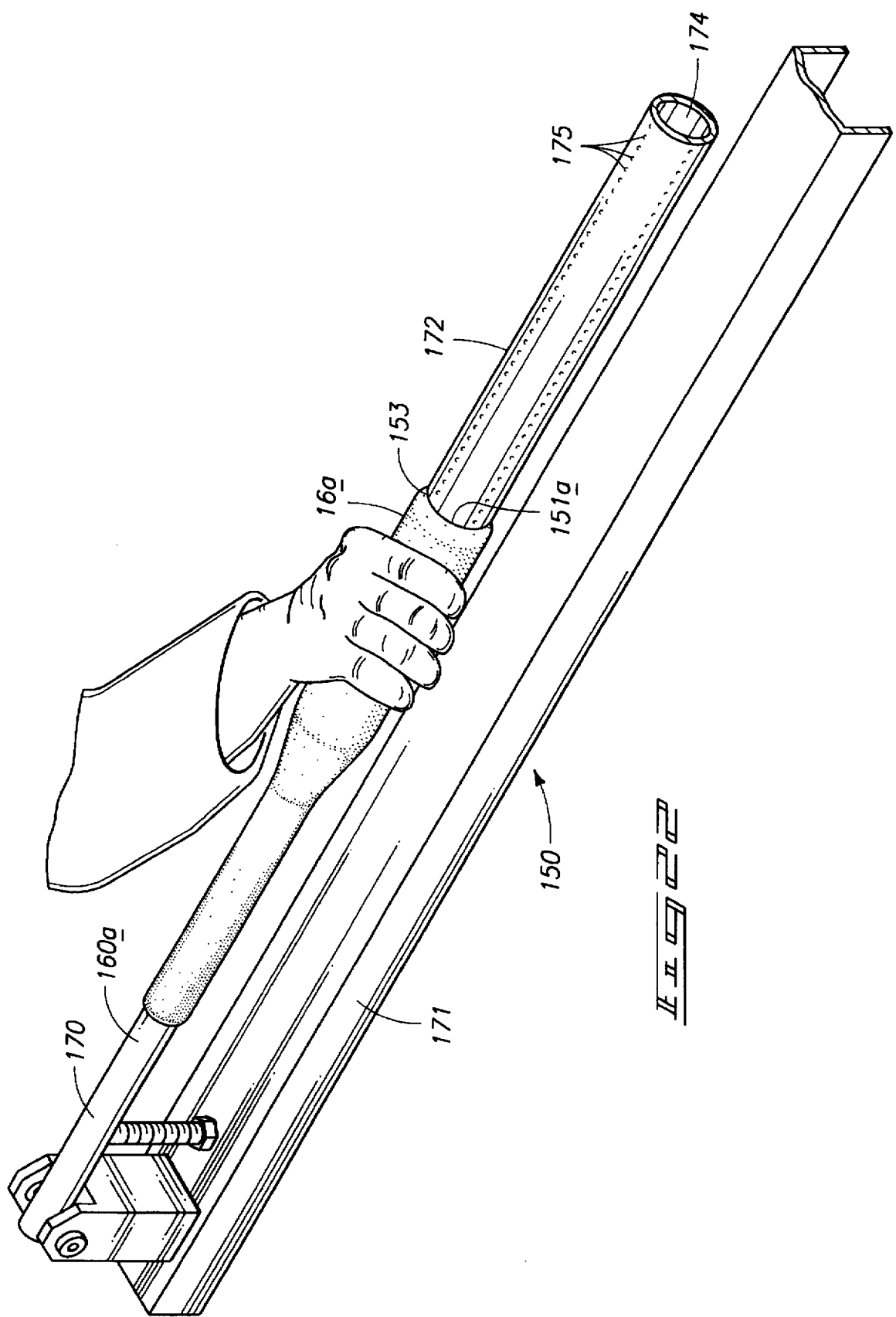
FIG. 22 is an operational view showing the elastomeric sleeve being slid onto a tubular member.

Fluid pressure is now directed through the fluid fitting 176 on the tubular member 172. The pressurized fluid will escape through the fluid passages in the porous cap 180, and along the tubular member 172. The escaping fluid will assist enlargement of the sleeve 16a and will produce a low friction substantially fluidized bed over which the sleeve may be moved as shown in FIG. 22. The sleeve will easily slide from the mandrel 160a and expand as it is slid onto the tubular member.

Figure 23:
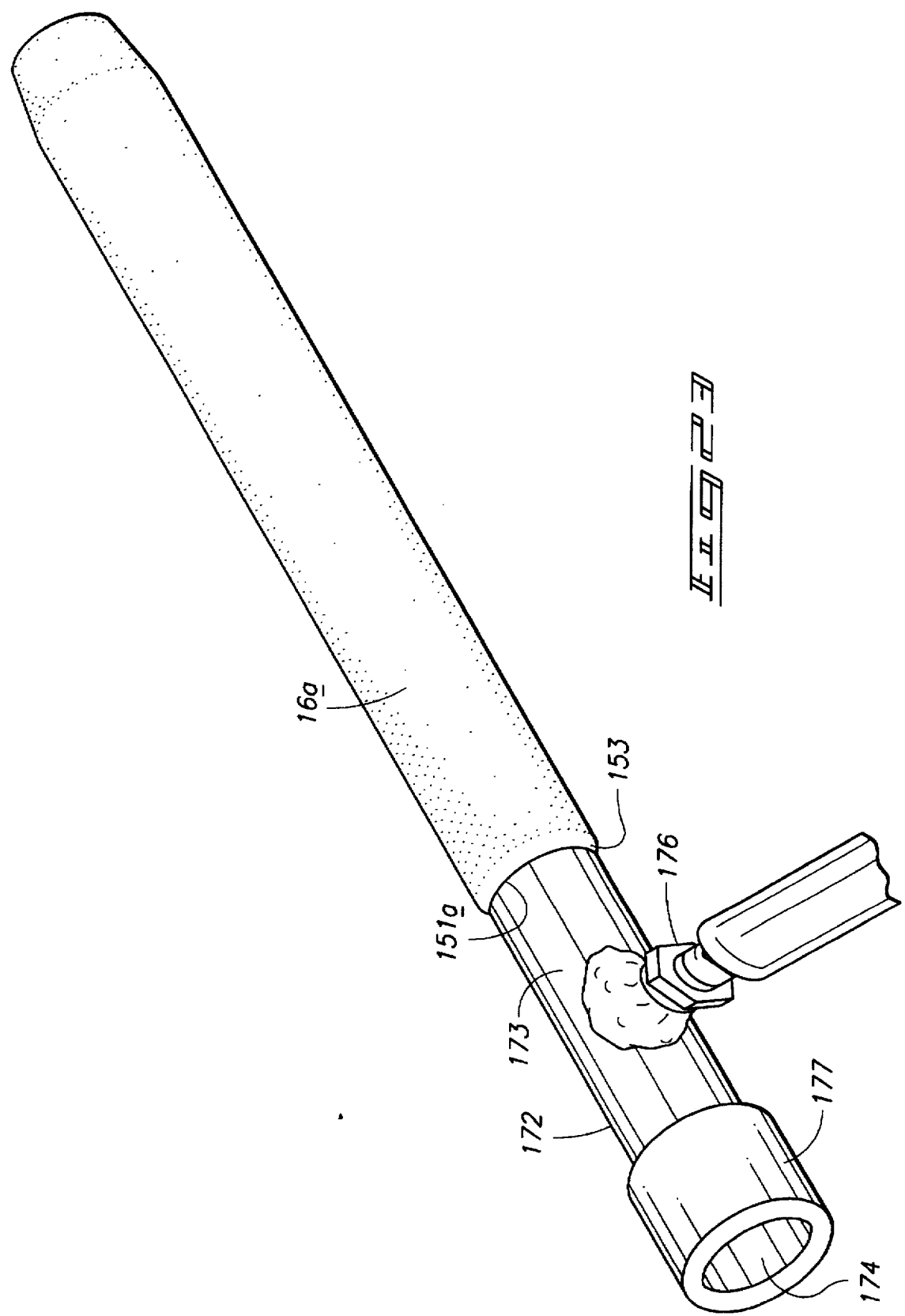
FIG. 23 is an enlarged perspective view of the elastomeric sleeve fitted over the tubular member.

Once the sleeve 16a is positioned on the tubular member 172, preferably with its trailing end still in contact with the porous cap 180, the fluid pressure may be turned off (using an appropriate conventional valve). Now the tubular member 172, the attached porous cap 180 and mandrel 160a may be pivoted upwardly on the frame 171 to allow the tubular member 172 and attached sleeve 16a to be removed from the mandrel 160a. The porous cap 180 is also removed at this point, leaving the overlapping end of the sleeve 16a projecting from the tubular member 172 as shown in FIG. 23.

Now the porous cap 180 may be removed and the tubular member 172 and sleeve 16a can be easily slid, shoulder end first over the shaft or pole 15 to any selected position along the pole length. The small portion of the sleeve projecting from the tubular member 172 will be expanded by the pole, and will slide along easily due to its minimal surface contact with the pole 15.

Once the tubular member 72 and sleeve 16a are moved to the selected position, the user may grip the trailing part of the sleeve 16a against the pole 15 and again apply pressurized fluid through the tubular member 172 (FIG. 24).

The pressurized fluid exiting through the apertures 175 in the tubular member will slightly expand the sleeve 16a and again create a fluidized bed, allowing the tubular member 172 to be extracted from under the sleeve 16a. The sleeve is held at the hand-clamped end in position (FIG. 24) on the pole as the tubular member 172 is slid along the pole 15. Now free of the tubular member 172, the sleeve 16a will contract tightly against the pole.

FIGS. 25–34 show a preferred form of the sleeve expansion apparatus 150 for preparing another form of the elastomeric sleeve 16b to be fitted over the pole 15 or other shaft. The sleeve 16b in the illustrated form, may be an elongated elastomeric plastic tube having a normal internal diameter slightly smaller than the external diameter of the shaft or pole 15. The exemplary sleeve 16b shown is substantially longer than the sleeve 16a described above and is not porous.

The expansion apparatus for expanding the sleeve 16b for application over a shaft 15 includes an elongated frame 190 mounting the mandrel 160b at one end thereof. The mandrel 160b in this instance is mounted at one end to the frame 190 and extends to a free end. The mandrel 160b is preferably a tubular or solid rod having an external diameter less than the internal diameter of the sleeve 16b so the sleeve will readily slide over the mandrel length. Preferably, the mandrel 160b is longer than the sleeve 16b.

A shuttle 191 is mounted to the frame adjacent the mandrel for movement along the mandrel length. Such movement may be selectively imparted by a cylinder 192 connected at one end to the frame 190, and at a remaining end to the shuttle 191. Extension and retraction of the cylinder 192 will thus cause the shuttle 191 to move longitudinally along the frame 190 and mandrel 160b.

The fluid discharge fitting 162b in this form includes a cuff 195 slidably mounted over the mandrel 162b. The cuff 195 includes forward sleeve engaging end 196 that is tapered to be received in an end of a sleeve received over the mandrel. An annular space defines an inner fluid passage 197 between the cuff 195, and mandrel 162b serves as an initial discharge for pressurized fluid received through a fluid coupling 198.

Figure 31:
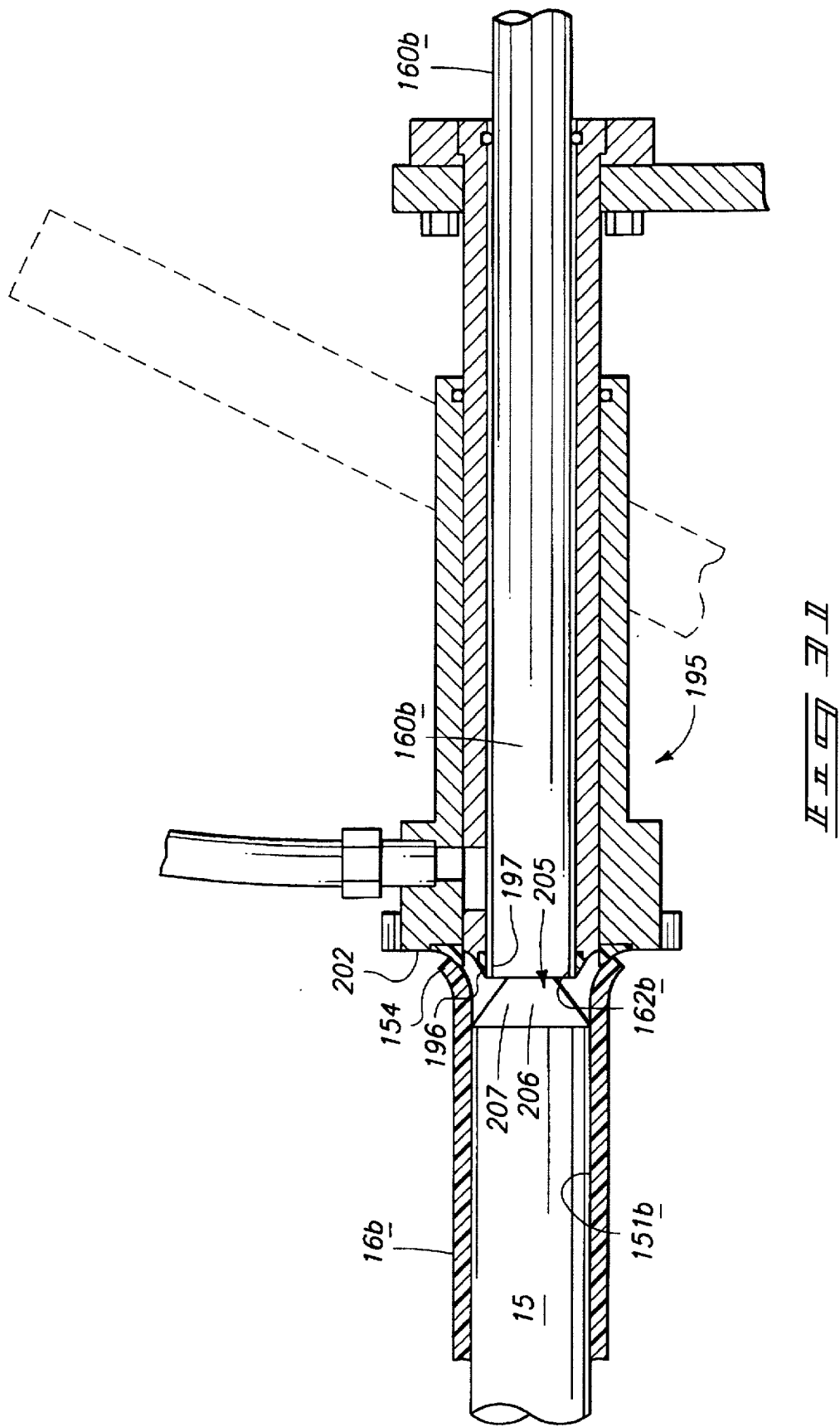
Figure 32:
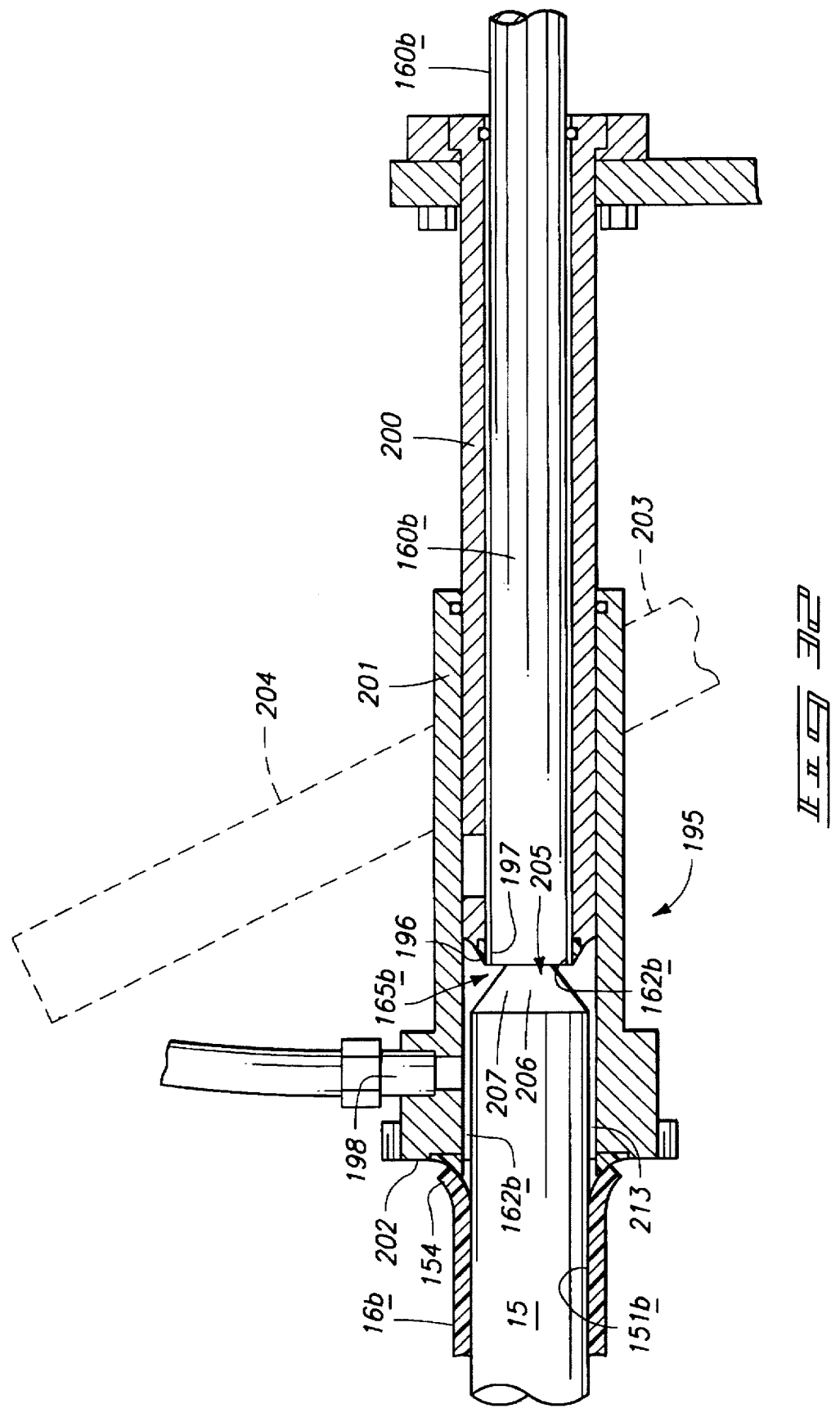
FIG. 32 is a sectional view similar to FIG. 31 only showing operation of the components shown therein to slide an elastomeric sleeve over the pole.

The cuff 195 is shown in detail in FIGS. 31, 32. It includes a cuff core member 200 which mounts the tapered sleeve engaging end 196, and defines the inner fluid passage 197 leading to the discharge point. The cuff 195 also includes a slidable outer collar 201 slidably mounted over the core member 200. The core member 200 is fixed to the shuttle 191, but the collar 201 is free to move longitudinally. An abutment surface 202 at an end of the collar is provided to engage and seal against the sleeve 16b.

A linkage 203 movably mounts the outer collar 201 of the cuff 195 to the shuttle 191 for movement with the shuttle 191 along the mandrel 160b. The linkage 203 may be selectively operated to shift the collar 201 longitudinally relative to the core member 200 as may be seen by comparing FIGS. 31 and 32. A lever 204 is provided, extending from the linkage 203 to facilitate hand operation of the linkage 203 to shift the collar 201 longitudinally relative to the shuttle 191 and mandrel 160b.

Figure 26:
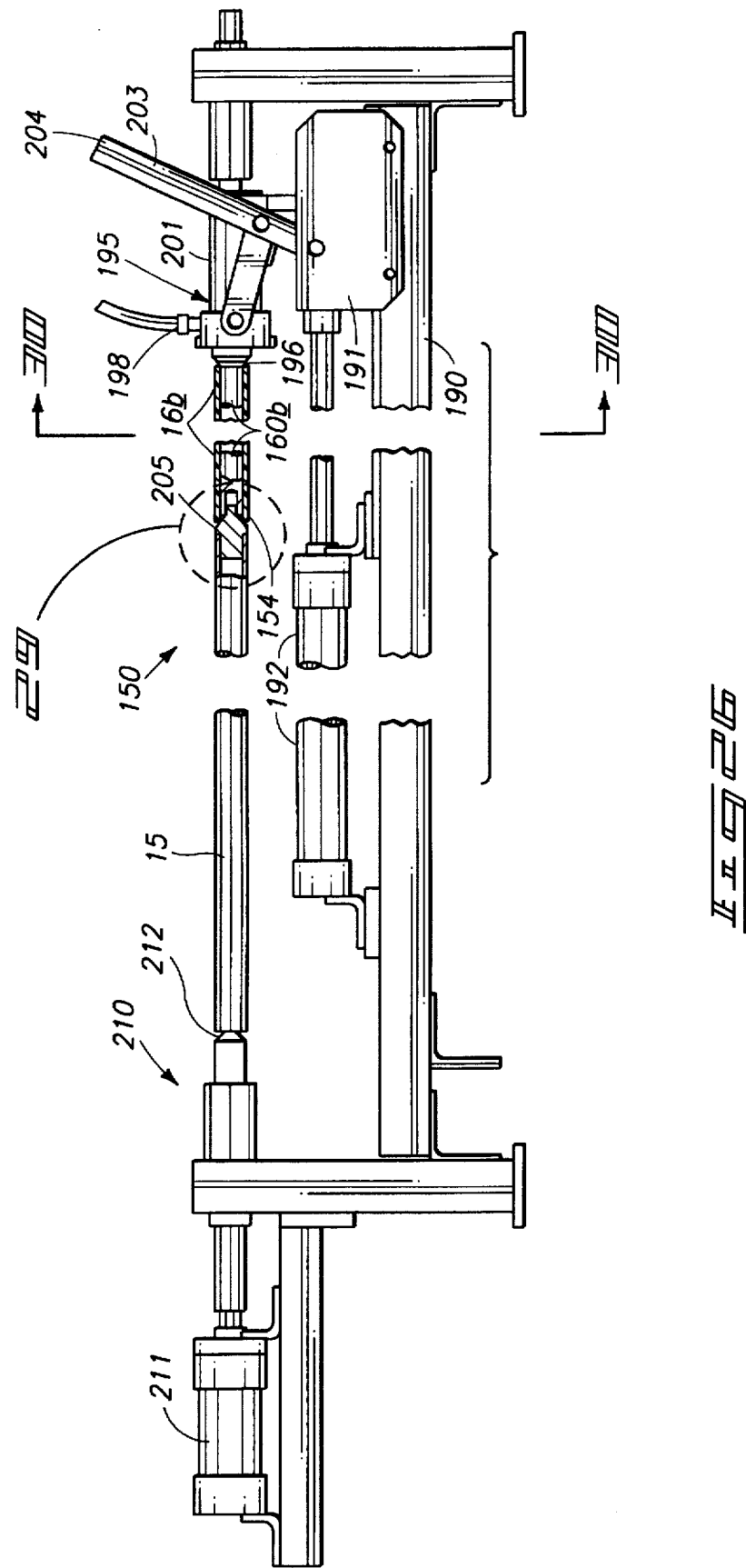
FIG. 26 is a view similar to FIG. 25 only showing a pole mounted to the elastomeric sleeve expansion device.
Figure 27:
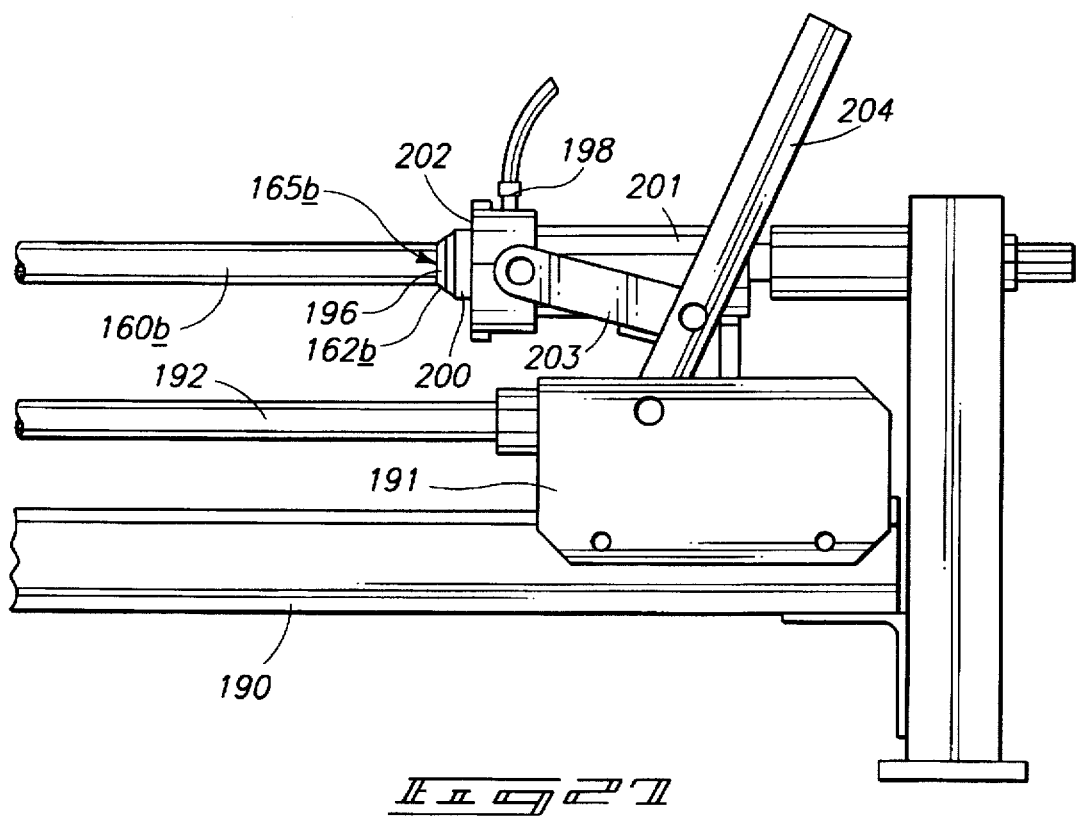
FIG. 27 is an enlarged detail view of a shuttle, cuff and linkage assembly of the apparatus shown in FIG. 25.
Figure 28:
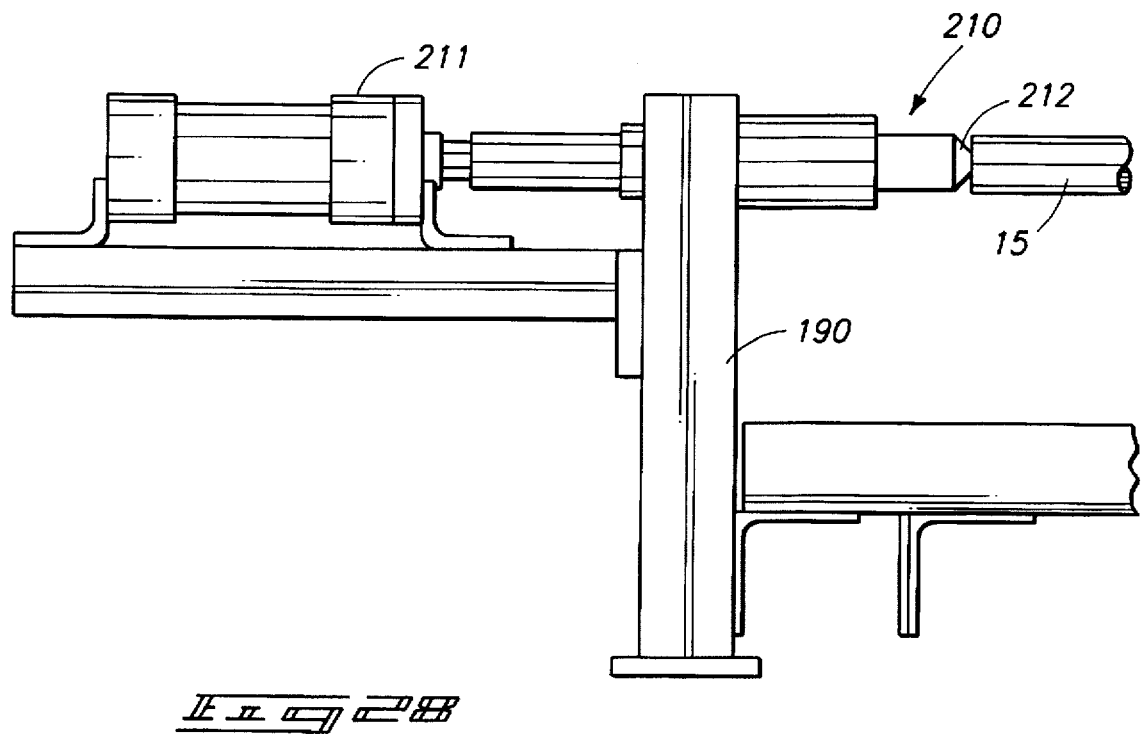
FIG. 28 as an enlarged fragmented view of a clamp means of the apparatus shown in FIG. 25.
Figure 29:
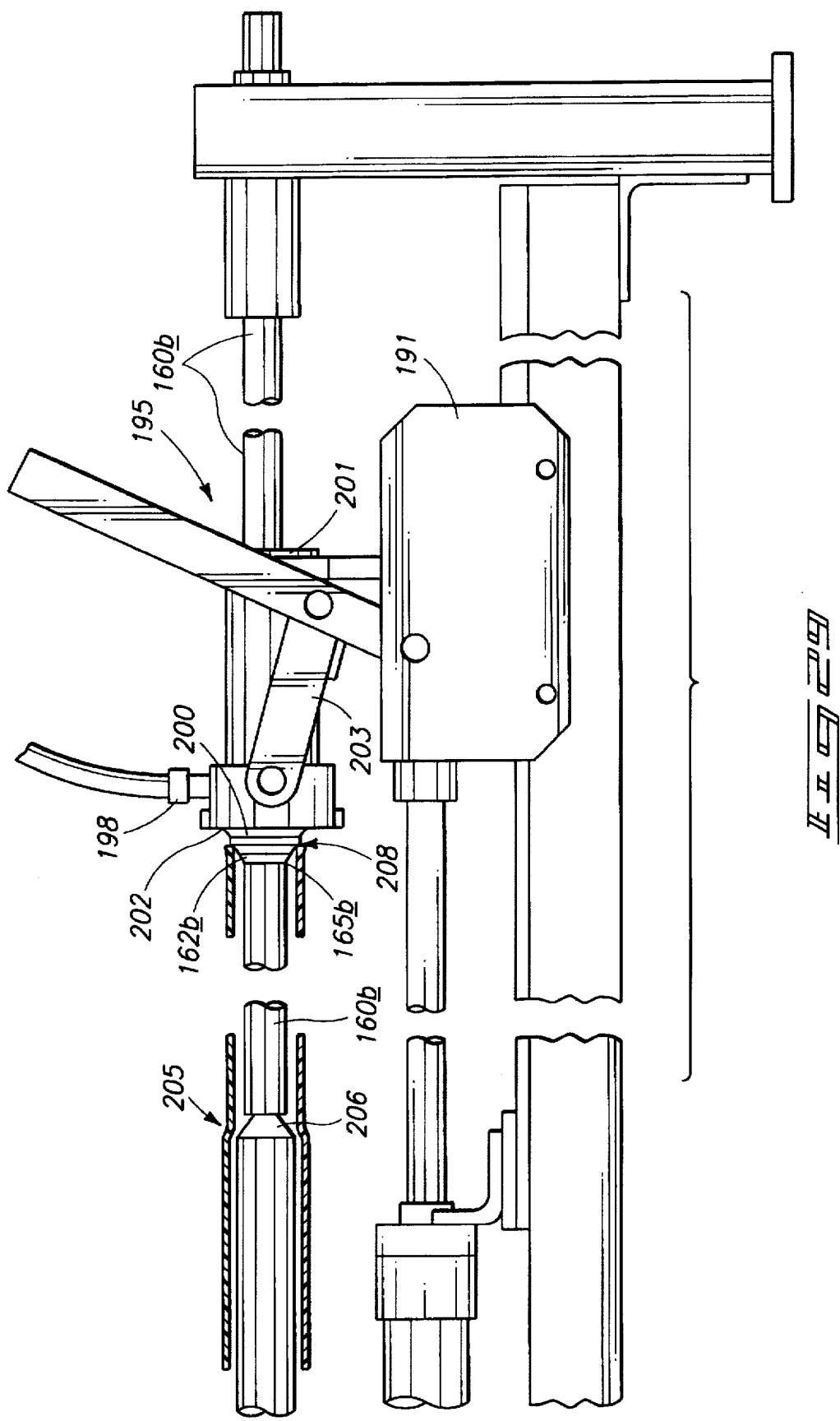
FIG. 29 Is an enlarged view similar to FIG. 27 only showing the shuttle, cuff and linkage in operation, sliding an elastomeric sleeve over a pole.
Figure 30:
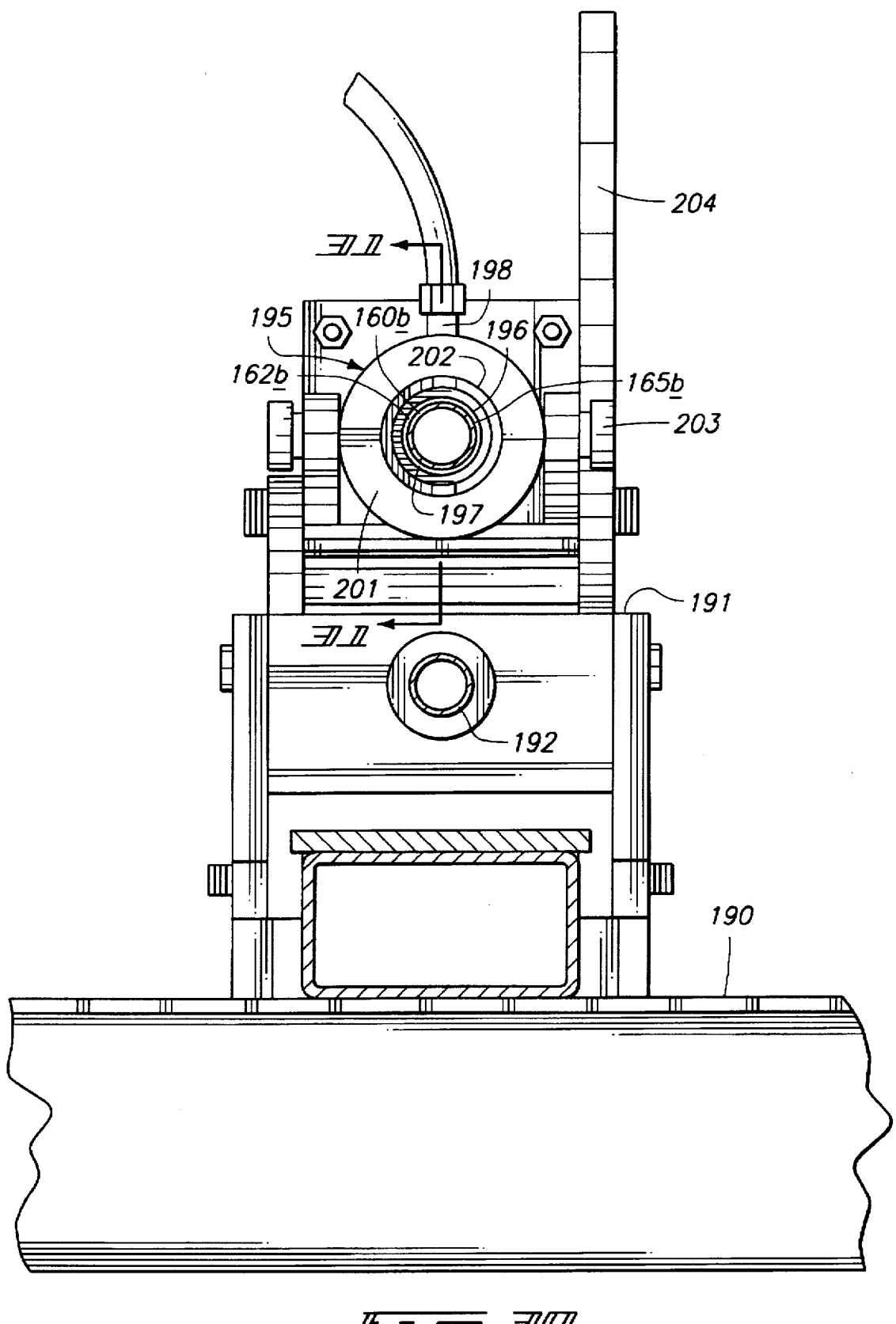
FIG. 30 is an enlarged sectional view taken substantially along line 30—30 in FIG. 26.
Figure 33:
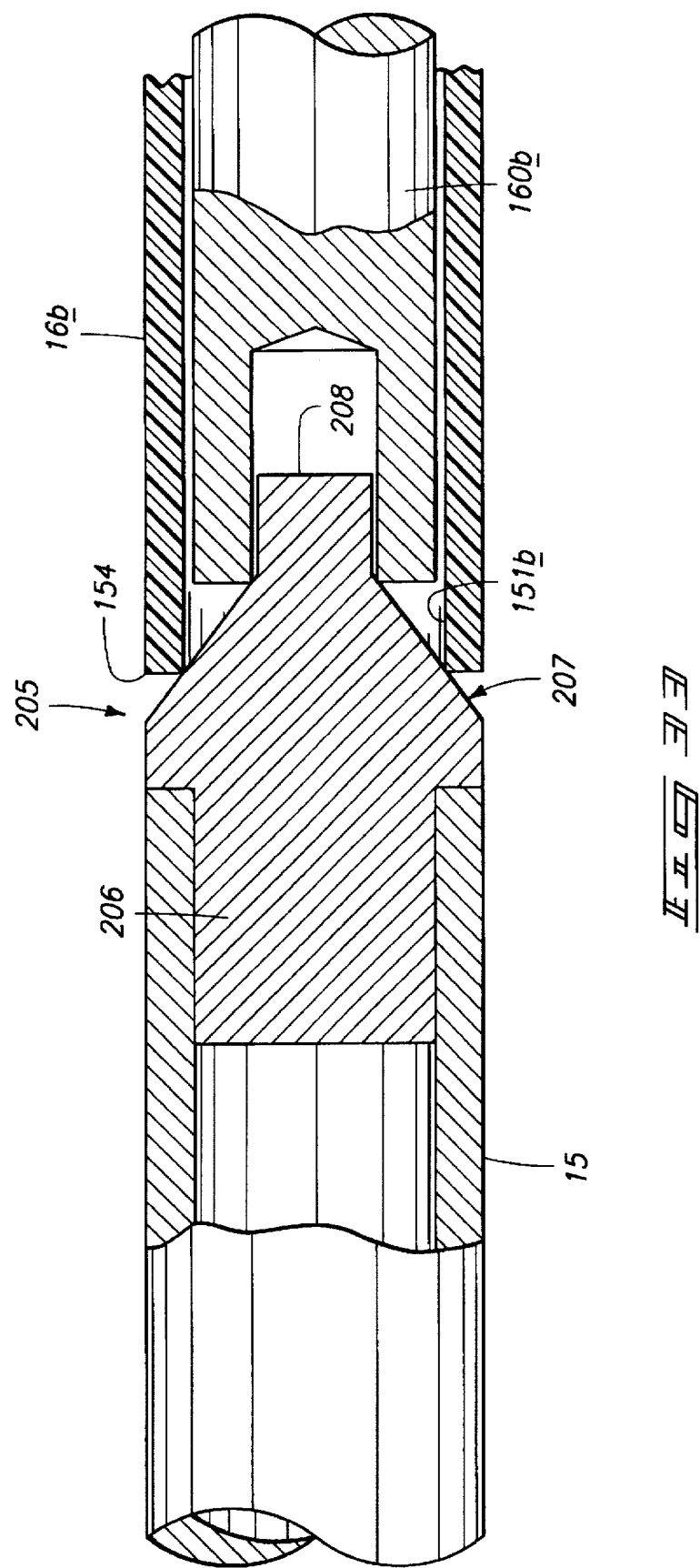
FIG. 33 is an enlarged fragmented view identified within the dashed circle identified at 33 in FIG. 26.
Figure 61:
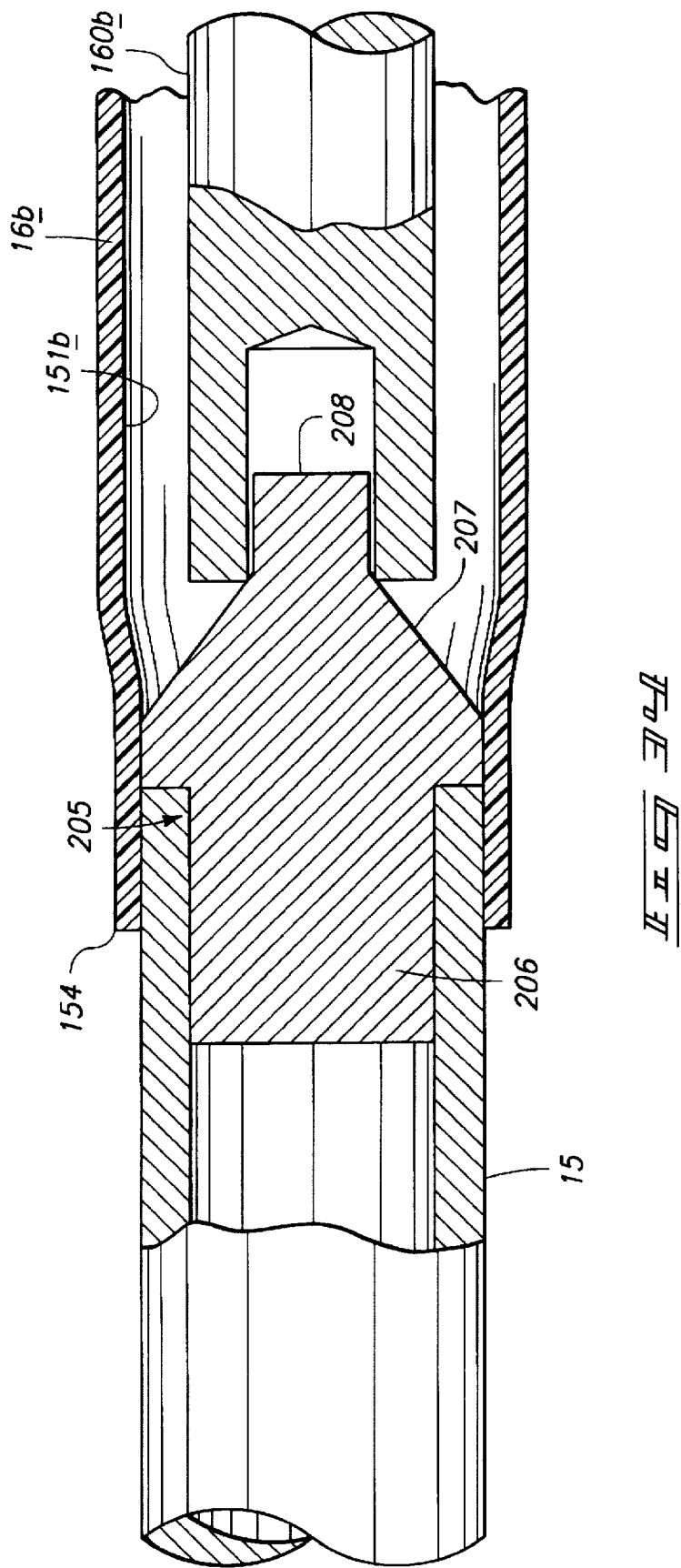

A mounting means 205 is exemplified in FIG. 26 and with a portion thereto detailed in FIG. 33 for releasably holding the shaft or pole 15 in coaxial alignment with the mandrel 160b. In a presently preferred form, the mounting means 205 includes a transition fitting 206 that is releasably received within the hollow end of the pole 15 and an opposite end for reception in the free end of the mandrel 160b. The fitting ends are axially aligned and will therefore hold the adjacent mandrel 160b and pole 15 ends in similar axial alignment.

An external surface of the fitting 206 tapers in a conical shape from a diameter substantially equal to the external diameter of the pole 15, to a reduced diameter at a reduced end 208, capable of being received within the bore of the mandrel 160b. This surface is used to seal against the end 154 of a sleeve 16b on the mandrel 160b and to guide the sleeve 16b onto the pole 15 as will be described below.

A clamp means 210 is also provided as part of the mounting means 205 on the frame 190, spaced from the mandrel 160b for releasably securing the pole 15 and transition fitting 206 in axial alignment with the mandrel 160b. The clamp means 210 in one preferred form includes an extensible cylinder 211 (FIG. 28) with a centering point 212 at an end for engaging an adjacent end of the pole 15 and holding it in axial alignment with the mandrel 160b. The clamp 210 can likewise be retracted to release the pole 15 following sleeve placement.

In operation, a sleeve 16b is first slid over the mandrel 160b, with one end coming into abutment with a projecting lip of an abutment surface 202 of the cuff 195. The lip forms a seal with the sleeve 16b. The mandrel 160b will function to hold the sleeve 16b substantially straight and coaxial with the mandrel axis, and will prevent the sleeve 16b from buckling when it is later shifted onto the pole 15.

Next a pole 15 is selected and the transition fitting 206 is placed in one end. The assembled pole 15 and transition fitting 206 are then placed between the cuff 195 and the centering point 212 of the clamp means 210. The clamp means 210 is then actuated to press the centering point 212 into the adjacent end of the pole 15, forcing the pole 15 and transition fitting 206 firmly against the free end of the mandrel 160b. The pole 15 is now held firmly and coaxial with the mandrel 160b and sleeve 16b.

Now the operator may selectively actuate the cylinder 192 to move the shuttle 191, cuff 195 and sleeve 16b along the mandrel 160b until the sleeve end 154 comes into contact with the transition fitting 160, thereby effectively sealing the interior of the sleeve 16b between the cuff 195 and transition fitting 206. As this is happening, sufficient fluid pressure may be applied through the discharge space 197 and into the sleeve 16b, to partially inflate the sleeve 16b as it engages the transition member (FIG. 34). The internal bore 151b of the sleeve 16b will expand to a point where the sleeve 16b may be easily moved longitudinally over the pole 15. Such movement is accomplished by continued retraction of the cylinder 192, to move the shuttle 191, cuff 195, and engaged sleeve 16b longitudinally over the pole 15. The sleeve 16b will remain partially inflated as it moves along (FIG. 29), with some air escaping between the sleeve 16b and pole 15, minimizing friction as the sleeve 16b is pushed onto the pole 15.

Retraction of the cylinder 192 is stopped as the cuff 195 reaches the end of the mandrel 160b and approaches the transition member 205 (FIG. 31), leaving a short length of the sleeve 16b extending between the cuff abutment surface 202 and the adjacent end of the pole 15. The linkage 203 can be used at this point to push the sleeve 16b further onto the pole 15, as demonstrated in FIGS. 31 and 32. The fluid pressure is automatically diverted during this procedure, from the discharge air space 197 to a space 213 between the cuff core 200 and the outer collar 201 (FIG. 32). As the lever is pivoted, the outer collar 201 is shifted, pushing the sleeve 16b further onto the pole 15. Fluid pressure is maintained between the sleeve 16b and pole as this process continues, and is stopped only when the sleeve reaches a selected position along the pole 15. Once the pressure is removed, the sleeve will contract toward its original diameter, securely gripping the pole.

It should be noted that both forms of the above sleeve installing apparatus 150 may be used in succession, so a handgrip type sleeve 16a may be placed over a previously installed longer plastic sleeve 16b on the same pole 15, if desired. Or a handgrip type sleeve 16a may be simply placed over a bare pole.

It is also considered that the sleeve installing apparatus 150 may be adapted to install other elastomeric sleeves over other forms of shafts than those shown in the drawings.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A powered pruning saw, comprising:
    a drive motor;
    an elongated drive shaft connected to the motor and extending to a remote end, rotatable responsive to operation of the drive motor to rotate about a drive shaft axis;
    a gear head mounted to the remote end of the drive shaft;
    a cutter arbor shaft connected to the gear head for rotation responsive to rotation of the drive shaft;
    a cutter attached to the cutter arbor shaft;
    a cutter oiler including an oil reservoir mounted on the gear head;
    an access plug on the reservoir, removable from the reservoir to permit filling the reservoir with oil;
    an oil metering cup within the reservoir, with a top open end positioned to be filled with oil responsive to tipping of the reservoir; and
    an oiler tube openly communicating with the oil metering cup and extending to a remote end adjacent the cutter, and positioned in relation to the oil metering cup to dispense oil by gravity flow from the oil metering cup.

2. A powered pruning saw, as claimed by claim 1, further comprising:
    a vent chamber formed within the reservoir, including a breather opening leading to the external environment, and an internal vent opening leading into the reservoir.

3. A powered pruning saw, as claimed by claim 1, further comprising:
    a vent chamber formed within the reservoir, including a breather opening formed as a tapered hole leading from an enlarged opening in the vent chamber to a reduced opening exposed to the external environment; and
    an internal vent opening leading from the vent chamber into the reservoir, the cross sectional area of the internal vent opening being larger than the cross sectional area of the reduced opening of the tapered hole.

4. A powered pruning saw, as claimed by claim 1, further comprising:
    a vent chamber formed within the reservoir, including a breather opening formed as a tapered hole leading from an enlarged opening in the vent chamber to a reduced opening exposed to the external environment; and
    an internal vent opening formed as an elongated slit in the vent chamber leading from the vent chamber into the reservoir, the cross sectional area of the internal vent opening being larger than the cross sectional area of the reduced opening of the tapered hole.

5. A powered pruning saw, comprising:
    a drive motor;
    an elongated drive shaft connected to the motor and extending to a remote end, rotatable responsive to operation of the drive motor to rotate about a drive shaft axis;
    a gear head mounted to the remote end of the drive shaft;
    wherein the gear head includes a gear housing formed of two housing halves;
    a pinion;
    a pinion bearing within the gear housing mounting the pinion for coaxial rotation with the drive shaft;
    a cutter arbor shaft;
    a gear on the cutter arbor shaft;
    a cutter arbor shaft bearing mounting the cutter arbor shaft and gear, with the gear in meshing engagement with the pinion for rotation about a cutter arbor shaft axis angularly offset from the drive shaft axis;
    a cutter attached to the cutter arbor shaft;
    a pinion shaft having the pinion at one end and a drive shaft receiver at a remaining end releasably receiving an end of the drive shaft;
    wherein the housing halves are joined along a plane normal to the cutter arbor shaft axis and include journal boxes formed therein for receiving and clamping the pinion bearing; and clamp members joining and securely fastening the housing halves together with clamping forces substantially parallel to the cutter arbor shaft axis.

6. A powered pruning saw, as claimed by claim 5 further comprising:

the cutter arbor shaft including an inside end;

a first journal at the inside end of the cutter arbor shaft;

the housing halves including a cutter mounting half and a cap half; and a bushing mounted within the cap half rotatably receiving the first journal.

7. A powered pruning saw, as claimed by claim 5 wherein the drive shaft receiver is formed to alternatively receive a standard socket drive extension.

8. A powered pruning saw, as claimed by claim 5 wherein the housing halves are comprised of:

a cutter mounting half;

a cap half for engagement with the cutter mounting half;

wherein the cutter mounting half and the cap half define an internal grease sump receiving the gear and the pinion; and a seal member situated between the cap half and the cutter mounting half extending about the grease sump and having ends in sealed abutment with the pinion bearing.

9. A powered pruning saw, as claimed by claim 5 wherein the housing halves are comprised of:

a cutter mounting half;

a cap half for engagement with the cutter mounting half;

wherein the cutter mounting half and the cap half define an internal grease sump receiving the gear and the pinion;

a seal member situated between the cap half and the cutter mounting half extending about the grease sump and having ends adjacent the pinion bearing; and seal member compression surfaces on one of the halves adjacent the pinion bearing and positioned on the one half to engage and compress the ends of the seal member against the pinion bearing.

10. A powered pruning saw, as claimed by claim 5 further comprising:

the cutter arbor shaft including opposed inside and outside ends;

a first journal at the inside end of the cutter arbor shaft;

a second journal between the inside end and the outside end of the cutter arbor shaft;

the housing halves including a cutter mounting half and a cap half;

a bushing mounted within the cap half rotatably receiving the first journal;

a bearing pocket formed on the cutter mounting half; and a bearing received within the bearing pocket, rotatably mounting the second journal of the cutter arbor shaft.

11. A powered pruning saw, as claimed by claim 5 further comprising:

the cutter arbor shaft including opposed inside and outside ends;

a first journal at the inside end of the cutter arbor shaft;

a second journal between the inside end and the outside end of the cutter arbor shaft;

the housing halves including a cutter mounting half and a cap half;

a bushing mounted within the cap half rotatably receiving the first journal;

a bearing pocket formed on the cutter mounting half;

a bearing received within the bearing pocket, rotatably mounting the second journal of the cutter arbor shaft;

wherein the outside end of the arbor shaft is threaded;

a sprocket slidably mounted to the arbor shaft outward of the second journal, and including an outwardly facing surface with a nut locking recess formed therein; and a nut threadably engaging the threads at the outside end of the arbor shaft and receivable within the nut locking recess such that the nut and the sprocket are effectively locked for co-rotation on the arbor shaft.

12. A powered pruning saw, as claimed by claim 5 further comprising:

the cutter arbor shaft including opposed inside and outside ends;

a ball bearing mounted to the housing and rotatably mounting the cutter arbor shaft;

the ball bearing including an inner ball race and an outer ball race, with the inner ball race rotatably mounting the cutter arbor shaft and the outer ball race being mounted to one of the housing halves;

a cutter carrier plate mounted to the gear housing and clamping the outer ball race to the housing; and a nut mounted to the arbor shaft operatively clamping the inner ball race to the gear on the arbor shaft.

13. A powered pruning saw, as claimed by claim 5 further comprising:

the cutter arbor shaft including an inside end and an outside end;

a first journal at the inside end of the cutter arbor shaft;

a second journal on the cutter arbor shaft located axially between the inside end and the outside end;

the housing halves including a cutter mounting half and a cap half;

a bushing mounted within the cap half rotatably receiving the first journal of the cutter arbor shaft;

a bearing pocket on the cutter mounting half;

a bearing received within the bearing pocket, rotatably mounting the second journal of the cutter arbor shaft;

wherein the bearing projects axially with respect to the cutter arbor shaft axis beyond the cutter mounting half; and a cutter carrier plate secured to the housing halves and clamping the bearing to the cutter mounting half.

14. A powered pruning saw, as claimed by claim 1 wherein the cutter is comprised of a cutting chain and a cutter bar mounting the cutting chain for movement about a defined circuit including an elongated upper flight and a lower flight;

a cutter bar carrier mounted to the gear housing and mounting the cutter bar to extend axially therefrom with respect to the drive shaft axis;

a sprocket cover mounted to the cutter bar carrier and covering the inward ends of the upper and lower flights;

a sprocket cover chip discharge opening formed in the sprocket cover adjacent the inward ends of the upper flight and the lower flight, and extending from below the lower flight at a forward discharge opening end, to a rearward discharge end approximately elevationally even with the lower flight.

15. A powered pruning saw, as claimed by claim 5 further comprising a cutter oiler mounted on the gear head and including:

a reservoir;

an access plug on the reservoir, removable from the reservoir to permit filling the reservoir with oil;

an oil metering cup within the reservoir, with a top open end positioned to be filled with oil responsive to tipping of the reservoir; and an oiler tube openly communicating with the oil metering cup and extending to a remote end adjacent the cutter, and positioned in relation to the oil metering cup to dispense oil by gravity flow from the oil metering cup.

16. A powered pruning saw, as claimed by claim 5 further comprising a cutter oiler mounted on the gear head and including:

a reservoir;

an access plug on the reservoir, removable from the reservoir to permit filling the reservoir with oil;

an oil metering cup within the reservoir, with a top open end positioned to be filled with oil responsive to tipping of the reservoir;

an oiler tube openly communicating with the oil metering cup and extending to a remote end adjacent the cutter, and positioned in relation to the oil metering cup to dispense oil by gravity flow from the oil metering cup; and a vent chamber formed within the reservoir, including a breather opening leading to the external environment, and an internal vent opening leading into the reservoir.

17. A powered pruning saw, as claimed by claim 5 further comprising a cutter oiler mounted on the gear head and including:

a reservoir;

an access plug on the reservoir, removable from the reservoir to permit filling the reservoir with oil;

an oil metering cup within the reservoir, with a top open end positioned to be filled with oil responsive to tipping of the reservoir;

an oiler tube openly communicating with the oil metering cup and extending to a remote end adjacent the cutter, and positioned in relation to the oil metering cup to dispense oil by gravity flow from the oil metering cup;

a vent chamber formed within the reservoir, including a breather opening leading to the external environment, and an internal vent opening leading into the reservoir; and said breather opening formed as a tapered hole leading from an enlarged opening in the vent chamber to a reduced opening exposed to the external environment; and said internal vent opening formed as an elongated slit in the vent chamber leading from the vent chamber into the reservoir, the cross sectional area of the internal vent opening being larger than the cross sectional area of the reduced opening of the tapered hole.

18. A cutter mounting gear head for a powered pruning saw, comprising:

a gear housing formed of joined housing halves, including a cutter mounting half and a cap half;

a bushing mounted within the cap half;

the cutter mounting half including an external surface with a bearing pocket formed therein;

the cutter mounting half and the cap half being joined along a plane;

a pinion;

a pinion shaft having the pinion at one end and a remaining end;

a pinion bearing within the gear housing mounting the pinion and the pinion shaft for rotation about a pinion shaft axis that is substantially parallel to the plane along which the cutter mounting half and the cap half are joined;

a cutter arbor shaft having an inside end and an outside end;

a first journal formed at the inside end of the cutter arbor shaft;

a second journal formed axially between the inside end and the outside end of the cutter arbor shaft;

the bushing within the cap half rotatably receiving the first journal at the inside end of the cutter arbor shaft;

a bearing mounted within the bearing pocket and projecting axially with respect to a cutter arbor shaft axis from the cutter mounting half, and receiving the second journal for rotation about the cutter arbor shaft axis;

a cutter mounting plate;

a gear on the cutter arbor shaft between the first journal and the second journal and situated within the gear housing between the housing halves in meshing engagement with the pinion;

clamp members joining and securely fastening the housing halves and the cutter mounting plate together with clamping forces substantially parallel to the cutter arbor shaft axis such that the bearing mounted within the bearing pocket is clamped between the cutter mounting plate and the cutter mounting half.

19. A cutter mounting gear head for a powered pruning saw, as claimed by claim 18 wherein the pinion shaft includes a drive shaft receiver at the remaining end; and wherein the drive shaft receiver is formed to alternatively receive a standard socket drive extension.

20. A cutter mounting gear head for a powered pruning saw, as claimed by claim 18, further comprising:

a grease sump formed by the cutter mounting half and the cap half enclosing the gear and the pinion;

a seal member situated between the cap half and the cutter mounting half extending about the grease sump and having ends adjacent the pinion bearing; and seal member compression surfaces on one of the halves adjacent the pinion bearing and positioned on the one half to engage and compress the ends of the seal member against the pinion bearing.

* * * * *